United States Patent
Koch et al.

(10) Patent No.: US 10,877,004 B2
(45) Date of Patent: Dec. 29, 2020

(54) METHOD FOR THE NON-DESTRUCTIVE TESTING OF A TEST OBJECT BY MEANS OF ULTRASOUND AND DEVICE THEREFOR

(71) Applicant: GE Sensing & Inspection Technologies GmbH, Hurth (DE)

(72) Inventors: Roman Heinrich Koch, Alzenau (DE); Stephan Falter, Huerth (DE); Reinhard Prause, Huerth (DE); Helmut Breidenbach, Huerth (DE); Christof Breidenbach, Huerth (DE); Thomas Weise, Huerth (DE)

(73) Assignee: GE SENSING & INSPECTION TECHNOLOGIES GMBH, Hurth (DE)

( * ) Notice: Subject to any disclaimer, the term of this patent is extended or adjusted under 35 U.S.C. 154(b) by 546 days.

(21) Appl. No.: 15/315,786

(22) PCT Filed: Jun. 3, 2015

(86) PCT No.: PCT/IB2015/002041
§ 371 (c)(1),
(2) Date: Dec. 2, 2016

(87) PCT Pub. No.: WO2016/009281
PCT Pub. Date: Jan. 21, 2016

(65) Prior Publication Data
US 2017/0219536 A1    Aug. 3, 2017

(30) Foreign Application Priority Data
Jun. 3, 2014 (DE) .................. 10 2014 107 819

(51) Int. Cl.
*G01N 29/44* (2006.01)
*G01N 29/46* (2006.01)
(Continued)

(52) U.S. Cl.
CPC ......... *G01N 29/4454* (2013.01); *G01N 29/04* (2013.01); *G01N 29/0645* (2013.01);
(Continued)

(58) Field of Classification Search
CPC .............. G01N 29/4454; G01N 29/04; G01N 29/0645; G01N 29/46; G01N 29/343; G01N 29/262; G01N 2291/105; G01N 2291/044
See application file for complete search history.

(56) References Cited

U.S. PATENT DOCUMENTS 5,833,614 A * 11/1998 Dodd ................... G01S 7/52038
600/447
6,469,957 B1 * 10/2002 Savord ................. G01N 29/346
367/137
(Continued)

FOREIGN PATENT DOCUMENTS

| DE | 102005051781 A1 | 5/2007 |
|---|---|---|
| EP | 1454132 A1 | 9/2004 |

(Continued)

OTHER PUBLICATIONS

Camacho et al., "Automatic Dynamic Depth Focusing for NDT", IEEE Transactions on Ultrasonics, Fenroelectrics, and Frequency Control, vol. No. 61, Issue No. 4, pp. 673-684, Apr. 2014.
(Continued)

*Primary Examiner* — Xin Y Zhong
(74) *Attorney, Agent, or Firm* — Mintz Levin Cohn Ferris Glovsky and Popeo, PC; Lisa Adams

(57) ABSTRACT

A method for the nondestructive testing of a test object by ultrasound is provided, the method including generating a pulsed ultrasonic field in the test object by means of an array of individually drivable ultrasonic transmitting transducers acoustically coupled to the test object. The ultrasonic trans-
(Continued)

mitting transducers are each driven with a specific analog transient excitation signal, wherein each analog transient excitation signal is generated based on an ultrasonic transmitting transducer-specific stored digital transient excitation function. The method further includes receiving resulting echo signals from the test object by means of an array of individually drivable ultrasonic receiving transducers, with each ultrasonic receiving transducer providing an analog time-resolved echo signal, temporarily storing the time-resolved, transducer-specific, digitized echo signals in the form of an echo signal set, and applying a plurality of different reception processing rules to the echo signal set.

23 Claims, 15 Drawing Sheets

(51) Int. Cl.
*G01N 29/26* (2006.01)
*G01N 29/34* (2006.01)
*G01N 29/06* (2006.01)
*G01N 29/04* (2006.01)

(52) U.S. Cl.
CPC ......... *G01N 29/262* (2013.01); *G01N 29/343* (2013.01); *G01N 29/46* (2013.01); *G01N 2291/044* (2013.01); *G01N 2291/105* (2013.01)

(56) References Cited

U.S. PATENT DOCUMENTS

| 7,429,352 B2 | 9/2008 | Bisiaux et al. |
| 2009/0178484 A1 | 7/2009 | Kroening et al. |
| 2011/0126626 A1* | 6/2011 | Koch .................... G01N 29/07 73/632 |
| 2011/0132091 A1 | 6/2011 | Falter et al. |

FOREIGN PATENT DOCUMENTS

| EP | 2294400 A2 | 3/2011 |
| EP | 2759817 A1 | 7/2014 |
| WO | 2009150066 A1 | 12/2009 |

OTHER PUBLICATIONS

German Search Report issued in connection with corresponding DE Application No. 102014107819.5 dated Feb. 6, 2015.
PCT Search Report and Written Opinion issued in connection with corresponding PCT Application No. PCT/IB2015/002041 dated Mar. 30, 2016.

* cited by examiner

| C1 | C2 | C3 | C4 | C5 | Output |
|---|---|---|---|---|---|
| 1 | 0 | 0 | 0 | 0 | +V1 |
| 0 | 1 | 0 | 0 | 0 | +V2 |
| 0 | 0 | 1 | 0 | 0 | -V1 |
| 0 | 0 | 0 | 1 | 0 | -V2 |
| 0 | 0 | 0 | 0 | 1 | GND |

FIG. 13

METHOD FOR THE NON-DESTRUCTIVE TESTING OF A TEST OBJECT BY MEANS OF ULTRASOUND AND DEVICE THEREFOR

BACKGROUND

The present embodiments relate to a method for the non-destructive testing of a test object by means of ultrasound, particularly to a method for generating a B-scan, C-scan or sector scan or a volume image of a test object. In particular, the test object may be a workpiece or a tool, such as a pipe section, a rod-shaped or plate-shaped material or a pressure vessel, such as a reactor pressure vessel. Further, the subject matter of the present disclosure is a device for carrying out the method according to the present embodiments.

A variety of devices and methods for the non-destructive testing of the volume of a test object by means of ultrasound are known according to the prior art. In particular since the introduction of the so-called phased array technique, which is based on the use of a plurality of independently drivable ultrasonic transducers and which permits a specific control of the insonification angle and the focus position of the generated ultrasonic field in the test object by variation of the transmission aperture and the relative phase position of the transmitting transducer elements, a largely automated ultrasound-based inline material testing, directly in the production process, for example of pipes or rod-shaped materials, is possible. Generally, pulsed ultrasonic fields are used here, which have a typical repetition rate of a few hundred to a few thousand Hertz and in which the insonified ultrasonic pulses have a medium frequency of typically one to about 10 Megahertz. Advanced inspection methods, such as they are apparent from EP 2 294 400 A1 or EP 1 454 132 A1, for instance, are based on the further development of the concept that the evaluation of the ultrasonic echo signals recorded by means of an array of receiving transducers in a time-resolved manner from the test object volume is stored for each individual transducer in a desired depth as regards time and is then subjected to a processing algorithm. This processing algorithm can be configured to be totally independent of the insonifying algorithm. For example, insonification can take place, for example, by means of a largely plane wave front, so that as large a test object volume as possible is transsonified. These stored echo signals of the individual receiving transducers can therefore basically stem from the entire transsonified test object volume. By specifically using phase shifts between the transducer-specific echo signals it is now possible to synthetically focus the ultrasonic echo in such a manner that all echo signals that are associated, for example, with a certain depth region in the test object or a certain volume element (voxel) in the test object volume are specifically added up. By means of a specific variation of the phase position within the context of a repeated application of the evaluation algorithm to one and the same set of echo signals correlated to a single insonified ultrasonic pulse, it is possible to scan, only by computation, the transsonified volume region by region and to generate in this manner a two- or three-dimensional image of the echo amplitudes stemming from the various volume regions of the test object. In this case, the family of FR 2 833 706 A1 has as its subject matter a method for the non-destructive testing of pipes by means of ultrasound, which is referred to by experts as the "paint brush method". If paint brush methods are mentioned within the context of the present application, this is to be understood as a reference to the publications of this patent family, Both WO 2009/150066 A1 and WO 2009/150067 A1 relate to the non-destructive testing of test objects with a great wall thickness. Amongst experts, the method disclosed therein is referred to as the "dynamic depth focusing method" (DDF method). If DDF methods are mentioned within the context of the present application, this is to be understood as a reference to the teaching of the above-mentioned two documents.

In addition, reference may be made to DE 10 2005 051 781 A1, which describes a method in which the transsonified test object volume is scanned, voxel by voxel, for echo signals by specific application of synthetic focusing by means of repeated application of an evaluation algorithm while varying the focusing parameters.

Though the aforementioned methods have proved their worth in the practice of largely automated material inspection, it was found, nevertheless, that difficulties related to multiple echoes can arise which may possibly result in faulty echo indications, particularly in the case of complex geometries. Therefore, the present embodiments are based on the object of further developing the above-mentioned methods in such a way that their reliability is enhanced over the methods known from the prior art even for cases of more complex test object geometries. Further, the object of the present disclosure is the proposal of a device suitable for carrying out the method according to the embodiments.

BRIEF DESCRIPTION

This object is achieved by a method and a device as disclosed herein.

Further disclosed are additional developments and configurations whose features may be freely combined with each other within the context of the usual actions of a person skilled in the art without a specific indication for this being required m the present application.

The method according to the embodiments is based on a development of the methods known from the prior art, which are based on the insonification of a directed plane wave into the test object, in that, using suitable beam generation techniques by means of an array of individually drivable ultrasonic transmitting transducers, a tested ultrasonic field, which is adapted in its geometry to the geometry of the test object and to the testing task to be carried out, can be specifically insonified into the test object. This means that the methods known from the prior art are being developed as regards transmission, with techniques being used in this case that have become known under the name "ultrasonic holography". They are based on the insight that it is possible to predefine, at any point in the test object volume, an ultrasonic field with a desired ultrasonic field geometry, and to reckon back from this ultrasonic field geometry the ultrasonic field distribution in time and space at the location of an array of ultrasonic transmitting transducers. If the array of ultrasonic transmitting transducers emits this distribution in time and space of ultrasonic signals into the test object, then the predefined ultrasonic field distribution desired at the observed point in the test object volume results therefrom. It is thus possible to specifically generate field distributions of the ultrasonic field insonified into the test object, which are optimally suitable for the transsonification of the volume regions of the test object to be examined. In addition, multiple echoes and crosstalk between different regions of the insonified ultrasonic field can be suppressed by skilled selection of the field geometry.

Therefore, the method according to the embodiments permits the insonification large sectors of the test object with a single ultrasonic pulse so effectively that echo signals can be received from them in principle. Therefore, fewer ultrasonic pulses are required than in the methods known from the prior art in order to transsonify the entire test object volume to be examined. For this reason, significantly increased testing speeds can be realized with the method according to the embodiments and the testing device according to the embodiments.

The method according to the embodiments serves for the non-destructive testing of a test object by means of ultrasound. Within the context of the method, in a first step, a pulsed ultrasonic field is generated in the test object. An array of individually drivable ultrasonic transmitting transducers acoustically coupled to the test object is used for this purpose. The ultrasonic transmitting transducers are each driven with a specific analog transient excitation signal, each analog transient excitation signal being generated based on an ultrasonic transmitting transducer-specific stored digital transient excitation function. The transient excitation functions to be used are generally numerically determined in a previous step, based on the geometry of the test object to be examined, as well as on the specific testing task, in this case particularly the position and orientation of the regions to be examined in the test object.

In another method step, the resulting echo signals are received from the test object. An array of individually drivable ultrasonic receiving transducers can be used also for this purpose, with each ultrasonic receiving transducer providing an analog time-resolved echo signal. In particular, the ultrasonic transmitting transducers can also be used as receiving transducers, so that one and the same array of ultrasonic transducers can be used both for emitting the ultrasonic pulses as well as for receiving ultrasonic echoes.

Then, the analog echo signals that were received in a time-resolved manner are digitized in a transducer-specific way, with the time-resolved, transducer-specific, digitized echo signals being temporarily stored in the form of an echo signal set.

In a subsequent method step, a plurality of different reception processing rules are then applied to this temporarily stored echo signal set, which is correlated with a single ultrasonic pulse insonified into the test object. In this case, a reception processing rule is characterized by at least the following reception processing parameters:

i. the number and identity of the ultrasonic receiving transducers whose echo signals are being taken into account in the reception processing rule, ii. individual phase shifts applied to the echo signals taken into account in the reception processing rule, and, if applicable, iii. time frames in which the echo signals lie that are to be taken into account in the reception processing rule.

The reception processing rule can in this case be applied in parallel or also sequentially. Very high processing speeds can be realized particularly in the case of a parallel application. It is possible in principle to complete the application of the different reception processing rules to the echo signal set before the next ultrasonic pulse is insonified into the test object.

A reception processing rule can be, for example, an evaluation rule in accordance with the teaching of U.S. Pat. No. 7,429,352 B2, i.e. an evaluation in accordance with the so-called "paint brush method". Alternatively, it can be an evaluation in accordance with an embodiment of the "dynamic depth focusing method" as described in WO 2009/150066 A1 or WO 2009/150067 A1. An evaluation rule analogous to the method described in DE 10 2005 051 781 A1 is also possible.

In an embodiment, the reception processing rules applied to the echo signal set differ in at least one of the reception processing parameters, such as, e.g., the number or/and the identity of the ultrasonic receiving transducers or the receiving transducer-specific phase shifts.

In an embodiment of the method, an image of at least one section of the test object volume is generated in another method step, based on the result of the applied plurality of reception processing rules. Such an image can be a 2- or 3-dimensional representation of the test object volume, or a B, C or sector scan. The generated representation is then displayed on a suitable display unit, such as an LCD.

In an embodiment of the method, a sound field geometry of the ultrasonic field insonified into the test object, which is adapted to the geometry of the test object and to the testing task to be carried out, is determined in a method step that generally takes place earlier. Then, the ultrasonic transmitting transducer-specific digital transient excitation functions are calculated that are suitable for generating an ultrasonic field in the test object with the predefined sound field geometry by means of the array of ultrasonic transmitting transducers. It was found that the suitable ultrasonic transmitting transducer-specific digital transient excitation functions can be determined based on a point transfer algorithm or a Fourier Transform algorithm, both of which are known from the prior art.

In principle, it is technically possible to generate, by means of digital-to-analog conversion, ultrasonic transmitting transducer-specific analog transient excitation signals from the stored ultrasonic transmitting transducer-specific digital transient excitation functions. In practice, however, this may entail an increased technical expenditure due to the required high excitation voltages. In practice, it has proved to be simpler, instead of a digital-to-analog conversion of the stored ultrasonic transmitting transducer-specific digital transient excitation functions, to approximate the corresponding analog transient excitation functions in each case by means of a series of multi-level square wave signals. A variety of multi-level square wave signal generators that are capable of generating several discrete positive and negative voltage levels in the required frequency range, which is typically between 1 and 100 MHz, and in the range of some 10 to 100 volts, is available in the prior art. Details in this regard will be addressed in connection with the exemplary embodiments.

An embodiment of the method is applied to a pipe-shaped test object. In this case, it may be particularly beneficial if the geometry of the generated ultrasonic field in the test object corresponds to a plurality of sections of the envelope of a cone whose axis of symmetry stands perpendicular on the pipe surface. In the case of this testing task, the danger of crosstalk of echo signals stemming from one cone envelope section to another cone envelope section can be minimized by the generated ultrasonic field having a disappearing sound amplitude in a plane extending through the insonification point and oriented transverse to the longitudinal pipe axis. It is thus prevented that echo signals resulting from a first insonified cone envelope section are erroneously ascribed to a second insonified cone envelope section. In this special embodiment of the method, the circumferential line of the pipe to be examined, in which the disappearing sound pressure from the insonified cone envelope sections is present, is tested by means of one or several separate test probes whose insonification direction, in the projection onto the pipe surface, lies exactly on the aforementioned circumferential line. In particular, this may be a phased array technique angle test probe, particularly two oppositely disposed phased array technique angle test probes, whose insonification angle into the pipe to be tested can be controlled electronically. This is possible, for example, with individually drivable ultrasonic transducer elements disposed in a linear array.

In a particular way of carrying out the method, it is not a particular insonification angle, which is being varied electronically from pulse to pulse, that is being used. Rather, it is possible to generate, by means of the linear array, a strongly divergent ultrasonic field, which propagates in the pipe to be examined along the above-mentioned circumferential line (in projection). The reception and evaluation is then carried out by means of the individual ultrasonic transducers of the array. Also in this case, the application of the reception processing rules can be done in accordance with the "paint brush method".

Another embodiment of the method is particularly suitable for testing test objects with an increased wall thickness, e.g. plate-shaped material, which is tested in a direction transverse to the plate direction, or rod-shaped material, which is to be tested along its longitudinal axis. Mention must also be made by way of example of safety vessels with a very large wall thickness, such as reactor pressure vessels or transport containers for radioactive waste. Within the context of the present embodiments, an increased wall thickness is supposed to be understood to mean the case where the wall thickness in the testing direction is at least three times, particularly five times, and in particular at least ten times the Rayleigh length for the ultrasound used. For a focused ultrasonic field with a Gaussian cross section, the Rayleigh length characterizes the length of the focus area in which a high ultrasound amplitude is provided. Therefore, echo signals stemming from this sector will have a high amplitude and are therefore particularly easy to detect. In contrast, discontinuities/flaws outside that region are irradiated with sound only with a weak ultrasound amplitude and will therefore possibly provide only small echo amplitudes. A good probability of detection can only be achieved if the focus region was moved through the entire depth of the test object to be tested.

Therefore, in an embodiment of the method, an ultrasonic field is generated that is cylindrically symmetric in the test object and has a focus whose length is greater than the Rayleigh length of the ultrasound used. Ultrasonic fields that are referred to as Bessel beams have proved to be particularly suitable. Acoustic fields whose intensity distribution transverse to their propagation direction is described by a Bessel function of the first kind are referred to as Bessel beams.

The suitable ultrasonic transmitting transducer-specific digital transient excitation functions can be calculated based on a point transfer algorithm or a Fourier Transform algorithm also in this case, based on the desired geometry of the ultrasonic field in the test object.

The features, modes of operation and advantages discussed above of the method according to the embodiments can also be directly transferred to the testing device according to the embodiments discussed below and to its various configurations and embodiments.

A device according to the embodiments for the non-destructive testing of a test object by means of ultrasound comprises an ultrasonic transmitting unit configured to generate a pulsed ultrasonic field in the test object by means of an array of individually drivable ultrasonic transmitting transducers, by the ultrasonic transmitting transducers each being driven with a specific analog transient excitation signal. Each analog transient excitation signal is generated by the ultrasonic transmitting unit based on an ultrasonic transmitting transducer-specific stored digital transient excitation function stored in the ultrasonic transmitting unit.

Moreover, the testing device comprises an ultrasonic receiving unit configured for receiving resulting echo signals from the test object by means of an array of individually drivable ultrasonic receiving transducers, with each ultrasonic receiving transducer providing an analog time-resolved echo signal.

By means of suitable functional groups in the ultrasonic receiving unit, the analog echo signals that were received in a time-resolved manner are digitized in a transducer-specific way and temporarily stored in a temporary memory in the form of an echo signal set.

Furthermore, the ultrasonic receiving unit is configured to apply a plurality of different reception processing rules to the echo signal set. Such a reception processing rule is characterized by at least the following reception processing parameters:

i. the number and identity of the ultrasonic receiving transducers whose echo signals are being taken into account in the reception processing rule, ii. individual phase shifts applied to the echo signals taken into account in the reception processing rule, and, if applicable, iii. time frames in which the echo signals lie that are to be taken into account in the reception processing rule.

In an embodiment of the testing device, the applied reception processing rules differ in at least one of the reception processing parameters.

In an embodiment of the testing device, the ultrasonic receiving unit is further configured to generate an image of at least one section of the test object volume based on the result of the applied plurality of reception processing rules. This can be, in particular, two- or three-dimensional. Furthermore, it can be B, C or sector scans of the test object.

In a further embodiment, the testing device is adapted to the specific geometry of the test object to be tested. In this embodiment, the ultrasonic transmitting unit is configured for insonifying an ultrasonic field into the test object whose sound field geometry is adapted to the geometry of the test object and to the testing task to be carried out.

In a development thereof, the ultrasonic transmitting unit further comprises a calculating unit configured for determining the ultrasonic transmitting transducer-specific digital transient excitation functions that are suitable for generating an ultrasonic field in the test object with the predefined sound field geometry by means of the array of ultrasonic transmitting transducers. In particular, the calculating unit can be configured for determining the suitable ultrasonic transmitting transducer-specific digital transient excitation functions based on a point transfer algorithm or a Fourier Transform algorithm.

In an embodiment of the testing device, the ultrasonic transmitting unit is configured to generate the ultrasonic transmitting transducer-specific analog transient excitation signals by means of a series of multi-level square wave signals.

In an embodiment of the testing device, the reception processing rules implemented in a functional unit of the ultrasonic receiving unit constitute an implementation of the paint brush method or of the dynamic depth focusing method.

In an embodiment of the testing device, the latter is configured for the inline testing of a pipe. In this case, the ultrasonic transmitting device is configured for generating an ultrasonic field in the test object whose geometry corresponds to a plurality of sections of the envelope of a cone, whose axis of symmetry stands perpendicular on the pipe surface.

In an embodiment of this testing device, the ultrasonic field, for whose generation the ultrasonic transmitting device is configured, has a disappearing sound amplitude in a plane extending through the insonification point and oriented transverse to the longitudinal pipe axis.

In another embodiment, the testing device is a device for testing a test object with an increased wall thickness. In that case, the ultrasonic transmitting device is configured to generate an ultrasonic field in the test object that is cylindrically symmetric and has a focus whose length is greater than the Rayleigh length of the ultrasonic pulses used for testing. In particular, the geometry of the ultrasonic field, for whose generation the ultrasonic transmitting device is configured, in the test object may correspond to a Bessel beam.

Within the context of the exemplary embodiments, embodiments of the ultrasonic transmitting unit and of the ultrasonic receiving unit are discussed by way of example, from which, in particular, further information becomes apparent on how the above-mentioned functional units/functional groups are to be realized technically.

Further advantages and features of the method and the testing device according to the present disclosure are explained below with reference to exemplary embodiments. They are to be understood as examples and as non-limiting, wherein features of the exemplary embodiments may possibly be combined with the features of the claimed methods or testing devices.

BRIEF DESCRIPTION OF THE DRAWINGS

The exemplary embodiments will be explained with reference to the attached drawing, in which:

FIG. 13 is a partial truth table for the circuit of FIG. 12.

Figure 1:
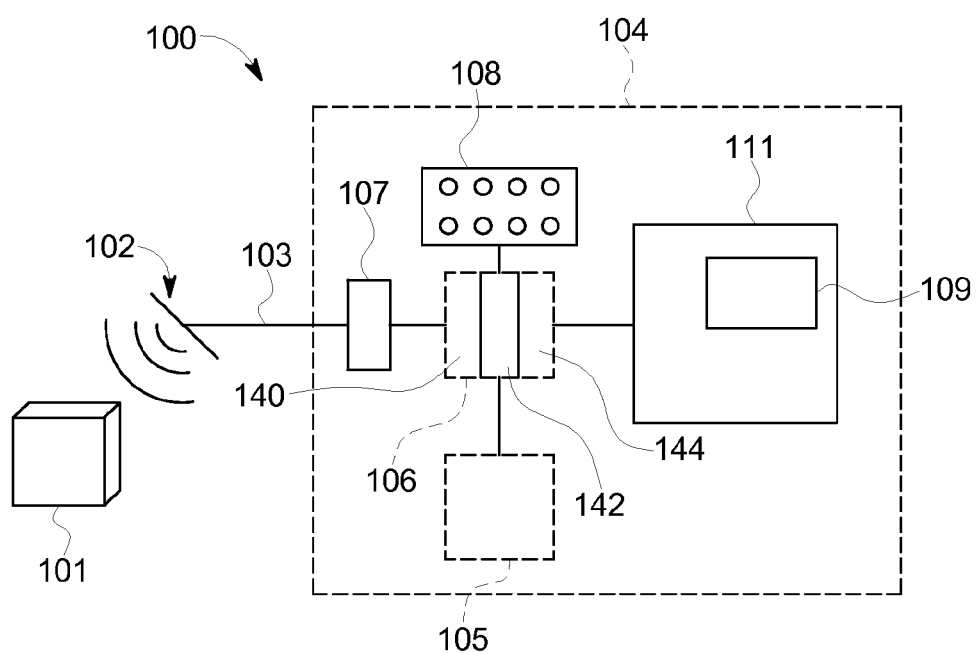
FIG. 1 is a schematic illustration of an exemplary ultrasonic holography system and an environment in which the system is used.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Ultrasonic holography imaging systems that use analog excitation signals are capable of producing detailed sound fields that are not constrained by the configuration of the transducer array, so as to provide enhanced imaging that is capable of addressing the shape and configuration of the physical item being imaged. The analog excitation signals can have varying amplitude, frequency, phase, time shift, or modulation of any of said parameters across transducer elements to achieve these effects.

Production of such analog excitation signals, however, requires complex and expensive circuitry and consumes a large amount of power. In addition, systems that use such signals are not readily amenable to implementation using ASICs, are restricted in the voltage levels that can be used for the excitation pulse, and are limited in terms of speed.

Accordingly, systems and methods are disclosed herein in which multi-level square wave excitation signals are used instead of or in addition to fully-analog excitation signals to drive an array of transceiver elements to create a sound field. Use of multi-level square wave excitation signals produces acceptable transceiver output with reduced complexity, cost, and/or power consumption as compared with use of fully-analog excitation signals. In addition, use of such signals facilitates system implementation using application-specific integrated circuits (ASICs) and is not as restricted in voltage level and speed. At the same time, the benefits and applications of fully-analog excitation signals (e.g., acoustic holography, beam superposition, signal-to-noise ratio (SNR) improvements, suppression of parasitic modes, increased material penetration, potential for coded pulsing algorithms, and suppression of side lobes in ultrasonic field) can still be achieved with multi-level square wave excitation signals.

As used herein, the terms multi-level square wave and multi-level rectangular wave are used interchangeably to refer to signals having a plurality of square or rectangular pulses or steps at discrete amplitude levels (positive and/or negative).

FIG. 1 is a schematic illustration of an exemplary ultrasonic holography imaging system 100 for use in performing ultrasonic holographic imaging of a physical item 101. The system 100 includes an ultrasonic transducer array 102 coupled to a processing system 104 via a connection 103.

The ultrasonic transducer array 102 emits ultrasonic pulses and also receives ultrasonic waves that are reflected off of the physical item 101. More specifically, ultrasonic waves emitted by the transducer array 102 penetrate into the physical item 101 and reflect off of structures within the physical item 101, such as areas of decreased density (which may be suggestive of corrosion) or other flaws or variations within the physical item 101. The ultrasonic transducer array 102 is a rectangular array (m times n units) of ultrasonic transceiver elements 110 (illustrated in FIG. 2). While a rectangular array is shown in the illustrated embodiment, it will be appreciated that other array types can be used, including any multi-element transducer array with a fixed geometric positioning of the individual transceiver elements. Exemplary array types include, without limitation, those having angular segments of concentric rings and/or sparse arrays in which not all possible positions are populated with transceiver elements. Each ultrasonic transceiver element is a piezoelectric transceiver element. It will be appreciated, however, that other types of ultrasonic transceiver elements can be used instead or in addition, such as electromagnetic acoustic transducers ("EMATs") or capacitive micromachined ultrasonic transducers ("CMUTs"). Each ultrasonic transceiver element 110 is configured to transmit and receive ultrasonic waveforms. It will be appreciated that separate transmitter and receiver elements can be used instead of or in addition to the common transceiver elements.

The connection 103 can be any suitable connection device(s) sufficient to enable the system 100 to function as described herein, including, for example, a hard-wired arrangement.

The processing system 104 includes an analog processing section 107 coupled to a digital processing section 106. The digital processing section 106 is coupled to a memory or other storage device 105 and a user input device 108 (e.g., a control panel, keyboard, keypad, or other device or devices). The digital processing section 106 provides signals to a display 111 to generate a display image 109.

In operation, several series of "shots" of the physical item 101 are taken while imaging the physical item 101. Accordingly, the ultrasonic transducer array 102 is moved to a first position relative to the physical item 101, and one or more series of ultrasonic pulses are emitted towards the physical item 101. Reflections of those ultrasonic pulses are received by the ultrasonic transducer array 102 and data corresponding to the emitted pulses and corresponding received reflections is stored and processed. The ultrasonic transducer array 102 is then moved to another position relative to the physical item 101 and another series of "shots" is taken. The number of shots taken and positions used is dependent upon the configuration of the physical item 101 and the type of data that is being acquired (e.g., imaging to detect flaws, etc.).

The ultrasonic transducer array 102 can be caused by the digital processing section 106 to emit ultrasonic waveforms that, upon contact with the physical item 101, in turn cause a variety of different waveforms to propagate through the physical item 101. Exemplary waveforms include compression waves or shear waves which penetrate into the interior of the physical item and are used to check for cracks or the detection of internal flaws, Rayleigh waves, which are typically confined to the surface of the physical item and are used, for example, in analyzing or determining mechanical and structural properties of a material, such as cracking; Lamb waves, which typically travel along the wall of a physical item and are used, for example, to find and characterize internal flaws and cracks in the physical item; and creep waves, which typically serve to access areas hidden below other parts of the physical item, e.g., welds or solders.

Figure 2:
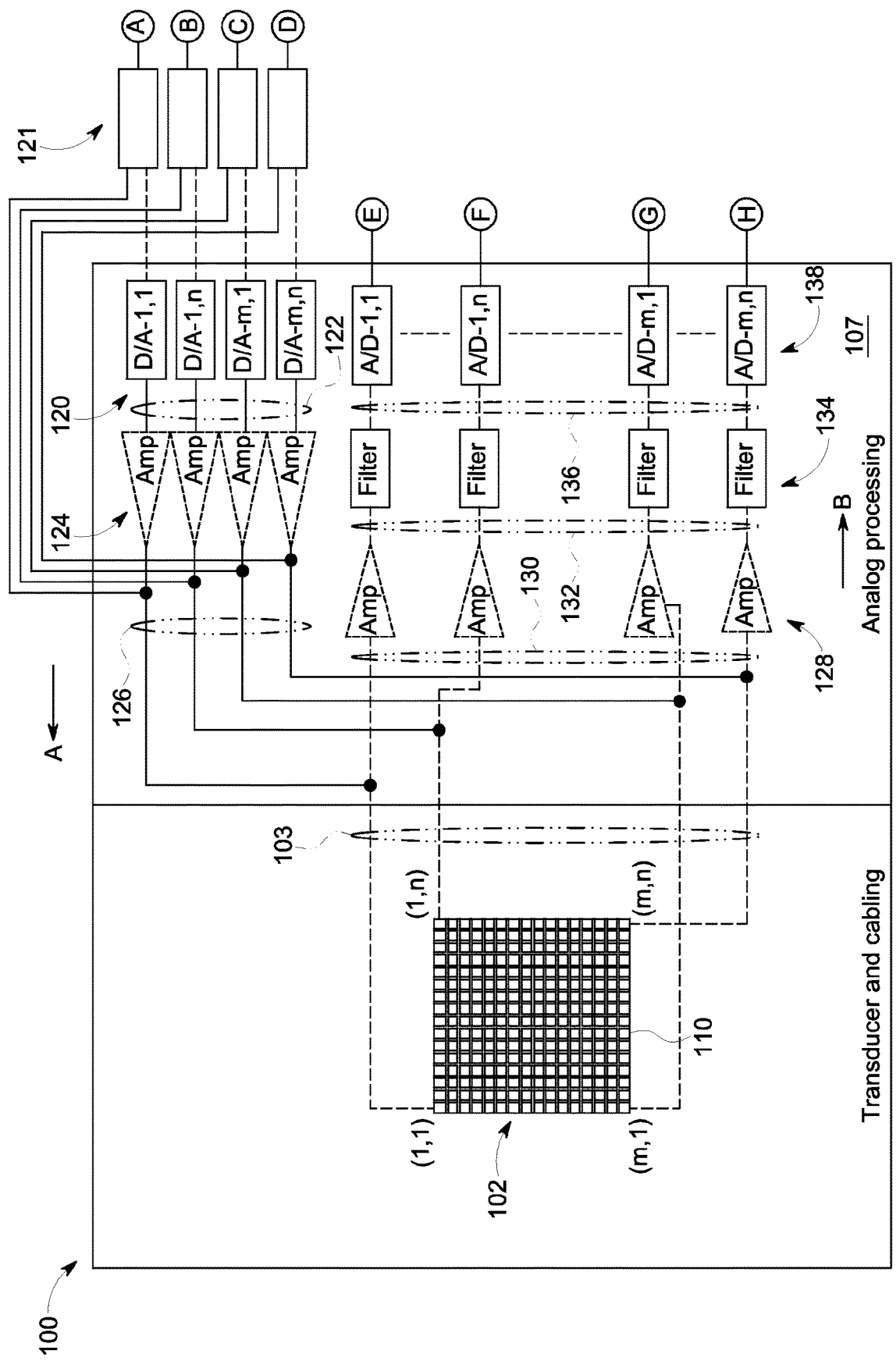
FIG. 2 is a portion of a circuit diagram illustrating the system of FIG. 1.
Figure 3:
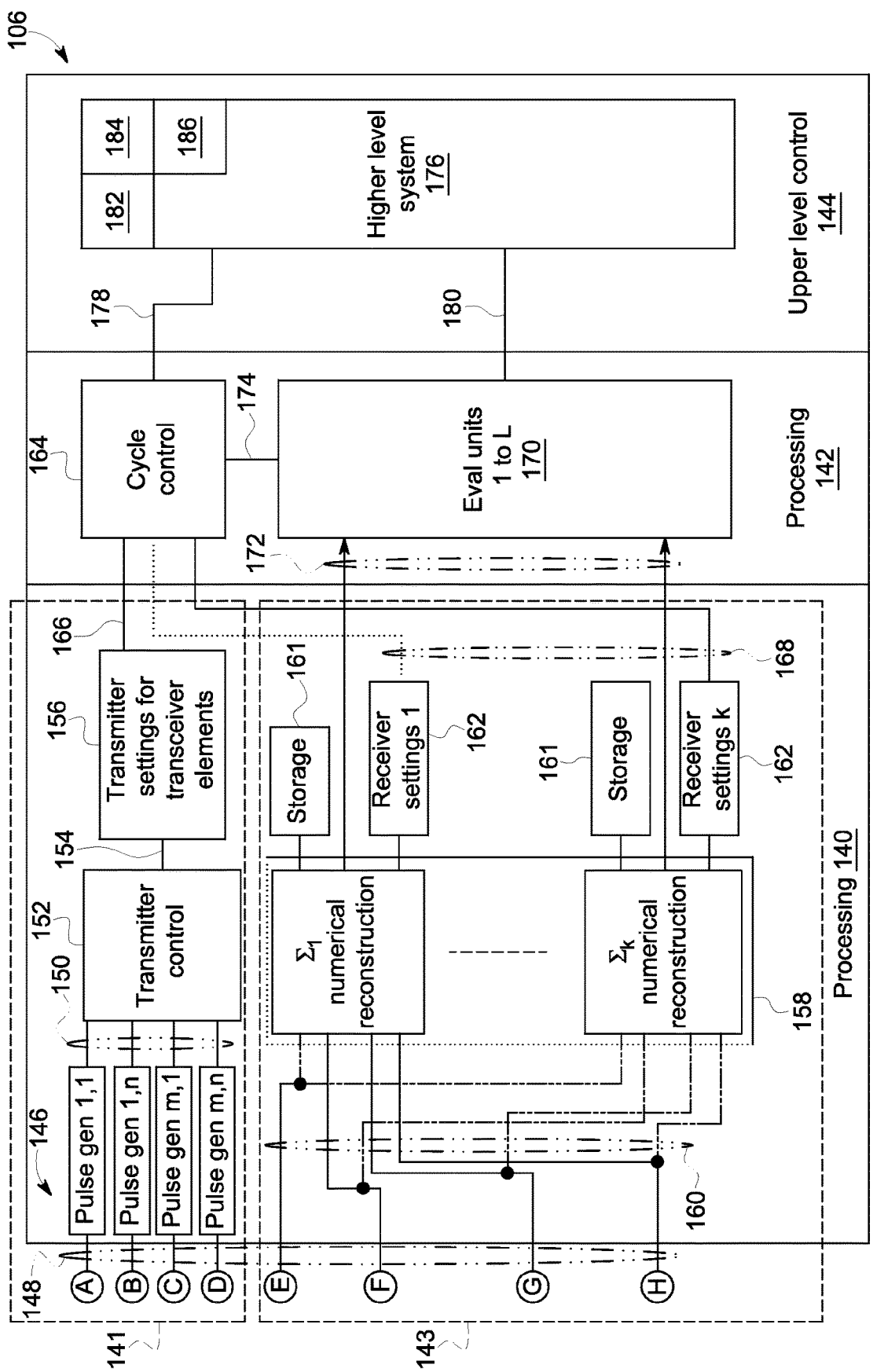
FIG. 3 is a further portion of a circuit diagram illustrating the system of FIG. 1.

FIGS. 2 and 3 together form a circuit diagram illustrating the system 100. Specifically, FIG. 2 depicts the ultrasonic transducer array 102 and the analog processing section 107 and FIG. 3 depicts the digital processing section 106.

Figure 17:
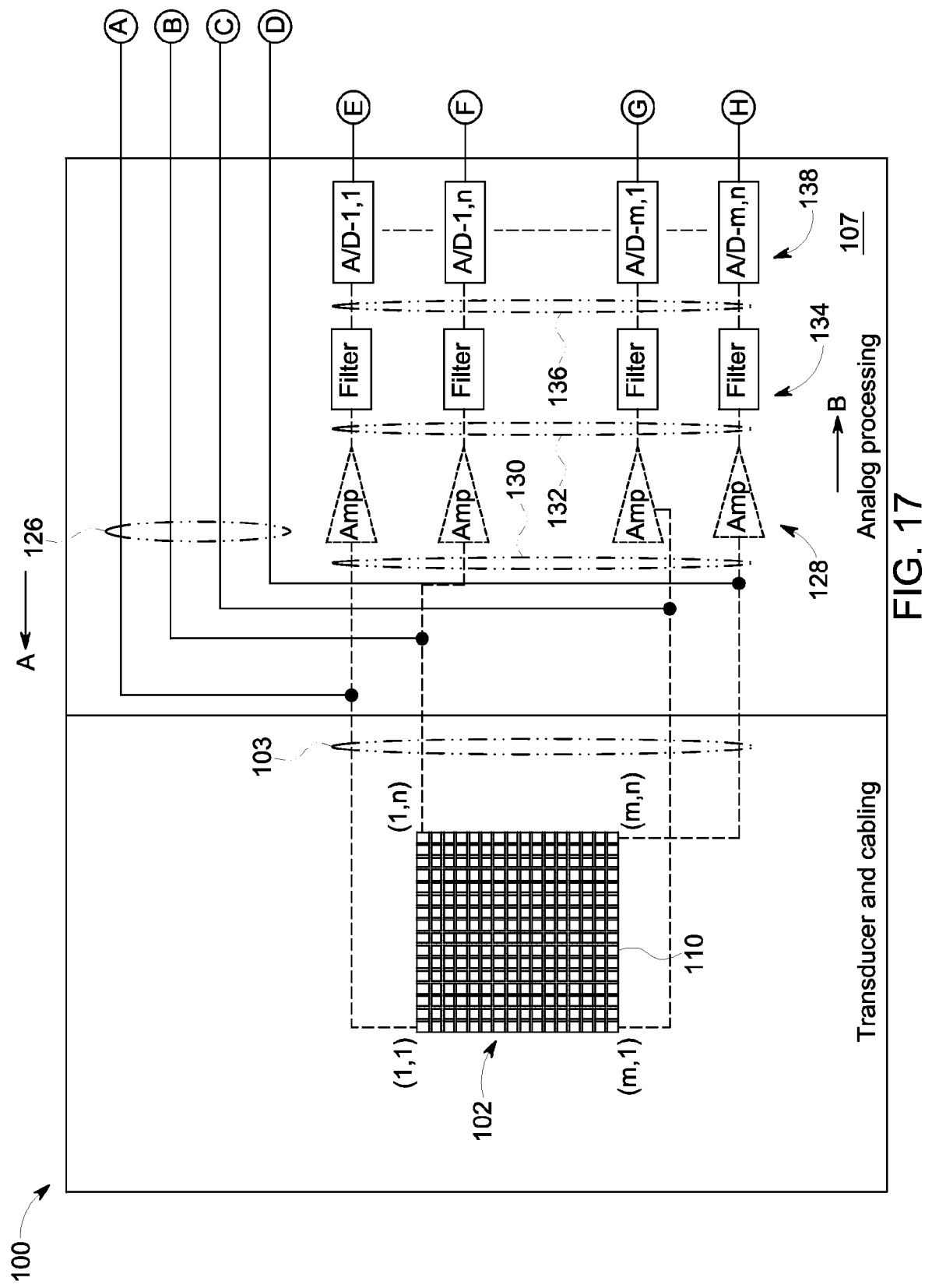
FIG. 17 is a portion of a circuit diagram illustrating another exemplary embodiment of an ultrasonic holography system.
Figure 18:
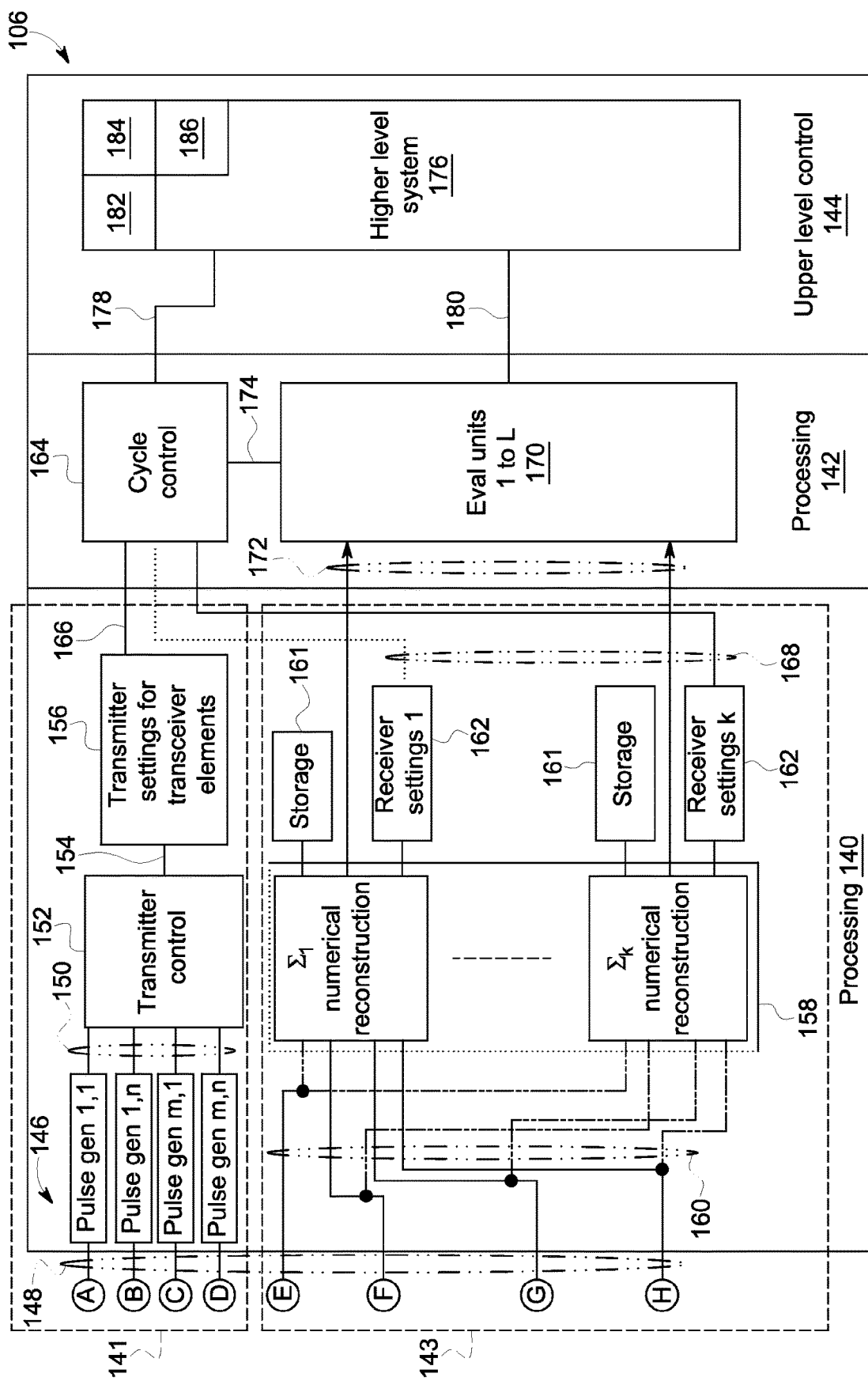
FIG. 18 is a further portion of the circuit diagram of FIG. 17.

The analog processing section 107 performs preprocessing of signals transmitted between the ultrasonic transducer array 102 and the digital processing section 106. The analog processing section 107 also allows for switching between operating modes of the system 100. As described in detail below, the system 100 is operable in a first mode in which multi-level square wave excitation pulses are used and a second mode in which fully-analog excitation pulses are used. It will be appreciated, however, that the system need not necessarily include provisions for operating in the second mode, in which case circuitry required for generating fully-analog excitation pulses can be omitted, as discussed below and as shown in FIGS. 17-18. It will further be appreciated that the system can operate in any of a number of hybrid modes of operation, in which one or more of the transceiver elements 110 are driven by multi-level square wave excitation pulses and one or more other transceiver elements are driven by fully-analog excitation pulses.

In the first mode of operation, the analog processing section 107 forwards excitation signals generated by the digital processing section 106 to the ultrasonic transducer array 102 (as indicated by an arrow A pointing to the left) to stimulate selected ones of the ultrasonic transceiver elements 110. In the second mode of operation, the analog processing section 107 converts digital signals generated by the digital processing section 106 into analog signals and amplifies the analog signals before forwarding them to the ultrasonic transducer array 102.

In either mode of operation, the analog processing section 107 also converts analog signals transmitted from the ultrasonic transceiver elements 110, that represent ultrasonic waves reflected from the physical item 101 and received by the ultrasonic transceiver elements 110, into digital signals and transmits those digital signals to the digital processing section 106 (as indicated by an arrow B pointing to the right).

The analog processing section 107 includes a plurality of switching devices 121 configured to selectively couple the outputs of a respective plurality of pulse generators 146 (shown in FIG. 3) to different locations in the analog processing circuitry depending on the selected operating mode of the system 100. In particular, in the first mode of operation, the switching devices 121 are configured such that the outputs of the pulse generators 146 are coupled directly to the ultrasonic transceiver elements 110 (via a plurality of connections 126 and a plurality of connections 103). In the second mode of operation, the switching devices 121 are configured such that the outputs of the pulse generators 146 are coupled to a plurality of digital-to-analog ("D/A") converters 120, which are in turn coupled via a plurality of connections 122 to a corresponding plurality of amplifiers 124. The amplifiers 124 are coupled, via the plurality of connections 126 and the plurality of connections 103 to corresponding ones of the ultrasonic transceiver elements 110.

Although only four sets of switching devices 121, D/A converters 120, amplifiers 124, and connections 103 are shown, it is understood that a set of these components is provided for, and coupled to, each of the ultrasonic transceiver elements 110.

The analog processing section 107 also includes a plurality of amplifiers 128 that are coupled, via connections 130, to the connections 103, and in turn to respective ones of the ultrasonic transceiver elements 110. Although only four amplifiers 128 are illustrated, it is understood that there is an amplifier 128 coupled to each of the ultrasonic transceiver elements 110. Each of the amplifiers 128 is coupled, via a plurality of connections 132 to a respective one of a plurality of filters 134. Each of the filters 134 is coupled, via a plurality of connections 136, to a corresponding one of a plurality of analog-to-digital ("A/D") converters 138. The filters 134 can be any suitable electronic signal filters necessary to enable the system 100 to function as described herein. The A/D converters 138 convert electronic waveforms received by the ultrasonic transceiver elements 110 and transmitted to the A/D converters 138 into digital signals.

The analog processing section 107 is coupled to the digital processing section 106. As shown in FIG. 3, the digital processing section 106 includes a primary digital processing section 140, a secondary digital processing section 142, and an upper level control section 144. The primary digital processing section 140 includes a waveform shaping section 141 and an image reconstruction and evaluation section 143.

In the waveform shaping section 141, a plurality of pulse generators 146 are coupled via a plurality of connections 148 to corresponding ones of the switching devices 121 (shown in FIG. 2). The pulse generators 146 are also coupled via a plurality of connections 150 to a transmitter control unit 152. The transmitter control unit 152 controls the pulse generators 146, depending on the operating mode of the system 100, to generate multi-level square wave excitation pulses, fully-analog excitation pulses, and/or a combination thereof. The transmitter control unit 152 optionally controls the pulse generators 146 to generate the excitation pulses by varying factors such as amplitude, frequency, phase, time shift, amplitude modulation, phase modulation, and frequency modulation with respect to each transceiver element 110. In embodiments in which the capability to generate fully-analog excitation pulses is omitted (e.g., the embodiment shown in FIGS. 17-18), the pulse generators 146 can be simpler pulse train generators specifically configured to generate multi-level square wave excitation pulses.

The transmitter control unit 152 is coupled via a connection 154 to a transmitter settings unit 156. The transmitter settings unit 156 stores and monitors settings for the ultrasonic transceiver elements 110 required to generate a specifically shaped ultrasonic pulse field, including selection of excitation pulse type as well as excitation pulse timing, magnitude, amplitude, frequency, time shift, and modulations of any thereof, for each pulse emitted by each ultrasonic transceiver element 110. The ultrasonic pulses propagate into the material area, where they interfere with each other. The result of this interference process is an acoustic image created inside the material.

In the image reconstruction and evaluation section 143, a summation unit 158 is coupled to each of the A/D converters 138 (shown in FIG. 2) via a plurality of connections 160. Each A/D converter 138 produces a single element digitized signal (also referred to as an "A-scan"). In order to perform a numerical reconstruction of the reflected sound field embodied in the individual A-scans, the summation unit 158 performs a summation process (also referred to as "numerical reconstruction") on the data signals received from each of the piezoelectric units, to produce a virtual A-scan of the complete physical item 101. In the illustrated embodiment, the summation unit 158 is configured as units in a plurality of FPGAs, though it will be appreciated that other components may be used in place of or in addition to FPGAs, such as ASICs.

The summation unit 158 is configured to apply a plurality of different reception processing rules to this temporarily stored echo signal set, which is correlated with a single ultrasonic pulse insonified into the test object and consists of a plurality of transducer-specific A-scans. In this case, a reception processing rule is characterized by at least the following reception processing parameters:

i. the number and identity of the ultrasonic receiving transducers whose echo signals are being taken into account in the reception processing rule, ii. individual phase shifts applied to the echo signals taken into account in the reception processing rule, and, if applicable, iii. time frames in which the echo signals lie that are to be taken into account in the reception processing rule.

A reception processing rule can be, for example, an evaluation rule in accordance with the teaching of U.S. Pat. No. 7,429,352 B2, i.e. an evaluation in accordance with the so-called "paint brush method". Alternatively, it can be an evaluation in accordance with an embodiment of the "dynamic depth focusing method" as described in WO 2009/150066 A1 or WO 2009/150067 A1. An evaluation rule analogous to the method described in DE 10 2005 051 781 A1 is also possible.

In an embodiment, the reception processing rules applied to the echo signal set differ in at least one of the reception processing parameters, such as, e.g., the number or/and the identity of the ultrasonic receiving transducers or the receiving transducer-specific phase shifts.

The image reconstruction and evaluation section 143 further includes a plurality of storage elements 161 for storing incoming unprocessed raw digital signals transmitted from the A/D converters 138. Storing such signals enables multiple evaluations to be performed using a single set of incoming data, e.g., for purposes of improving quality of subsequently processed digital signals.

The image reconstruction and evaluation section 143 serves several functions. One function is to translate raw analog data signals transmitted from ultrasonic transducer array 102 and preliminarily processed by analog processing section 107, using the above-mentioned reception processing rules, into a series of A-Scan Sums. The A-Scan Sums serve as a basis for ultrasonic test evaluation, performed in the secondary digital processing section 142, specifically in evaluation units 1-L, whose results may be used to interact with automation systems or image maps like B-Scans or C-Scans known to those skilled in the art. Collectively, the series of A-Scan Sums form a raw virtual image of the physical item 101. The image reconstruction and evaluation section 143 processes the raw virtual image to remove noise by optimizing echoes created by features within the physical item 101 that might serve as reflectors of the ultrasonic waves being emitted into the physical item 101. Such reflectors can represent flaws within the physical item 101. The functions ascribed to the secondary digital processing section 142 may be performed by any suitable processor devices configured to enable the secondary digital processing section 142 to function as described herein.

As in the analog processing section 107 and the primary digital processing section 140, the secondary digital processing section 142 includes functions related to the creation of the waveforms that the ultrasonic transducer array 102 transmits into the physical item 101, as well as functions related to processing of waveforms reflected from the physical item 101 and received by the ultrasonic transducer array 102. A cycle control unit 164 is coupled to the transmitter settings unit 156 via a connection 166, and is coupled to the summation unit 158 via a plurality of connections 168. The evaluation units 170 are coupled via connections 172 to the summation unit 158 and to the cycle control unit 164 via a connection 174.

The cycle control unit 164 is coupled to a higher level processing unit 176, located in the upper level control section 144, via a connection 178. The evaluation units 170 are coupled to the higher level processing unit 176 via connection(s) 180.

The cycle control unit 164 is configured to regulate operations of the system 100. Specifically, the system 100 functions in a series of cycles. Each cycle includes a set of specifically configured ultrasonic pulses (or "tone bursts") emitted from each of the ultrasonic transceiver elements 110, followed by a pause, followed by the receipt of a series of reflected sound waves by each of the ultrasonic transceiver elements 110, which are, in turn, converted by the analog processing section 107 into a series of digital signals to be processed by the digital processing section 106. Data corresponding to each set of ultrasonic pulses is stored in the cycle control unit 164 in the form of a table (a "cycle table") that defines various characteristics of each series of pulses, such as the number of "shots" to be taken, the directions in which each shot is taken, the number of positions around the physical item 101 that shots are to be taken, etc.

The evaluation units 170 perform ultrasonic test evaluations on raw virtual images created and stored in the summation unit 158, or results deduced therefrom, according to techniques known to those skilled in the art. Each raw virtual image represents a plurality of ultrasonic reflections of ultrasonic "shots" taken at a predefined series of time intervals and a plurality of positions about the physical item 101 to generate a three-dimensional ultrasonic "field."

An additional function of the evaluation units 170 is correlation of data acquired during testing with positions on the physical item 101. Specifically, position encoders (not shown) are coupled to the ultrasonic transducer array 102 and to the digital processing section 106, to report and record positions of the ultrasonic transducer array 102 relative to the physical item 101. Analysis of the ultrasonic field includes, for example, selection of a segment or "slice" in time (also referred to as a "gate"). The gate is analyzed to determine the largest sound wave amplitude within the gate, and a measured time of flight associated with that amplitude.

As used herein, "time of flight" of an echo refers to the amount of time required for a sound wave to travel through the physical item 101 and back from an echo generating feature of the physical item. The selected amplitude is compared to a predefined reference amplitude, and the measured time of flight is compared to a predefined reference time of flight. If the selected amplitude exceeds the value of the reference amplitude, then a defect is deemed to be present at a physical location within the physical item 101 that is associated with the selected gate. Likewise, defects can be detected by evaluating the time of flight. For example, a measured time of flight associated with a selected gate that registers below the predefined reference time of flight may be indicative that the strength of the material in the physical item 101 at the associated location is too low (e.g., due to internal corrosion at that location). Alternatively, for situations in which corrosion is present on an external surface of the physical item 101, the measured time of flight may be greater than the predefined reference time of flight.

The higher level processing unit 176 includes PCs, desktop systems, stand-alone CPUs, and/or other systems that use the evaluations generated by the evaluation units 170 to perform various tasks such as recording data regarding the physical item 101, stimulating a process control, and/or generating a visualization for a user. In addition, the higher level processing unit functions as a command center for the system 100, wherein a user inputs instructions and data, such as data regarding the physical item 101, and parameters for causing the waveform shaping section 141 to create signals that will induce, in the physical item 101, the desired acoustic image tailored to cause potential reflectors in the material to optimally reflect acoustic waves for reception by the system 100 and subsequent processing of those acoustic waves. In some embodiments, specific types of acoustic waves, such as Rayleigh Waves or Lamb Waves, are excited within the physical item 101.

The higher level processing unit 176 also includes display devices 182 (e.g., two- and three-dimensional visual displays), user input devices 184 (e.g., keyboards, touchscreens, etc.), communications interfaces 186, and other equipment associated with ultrasonic materials analysis as known to those skilled in the art. A user provides input to the cycle control unit 164 via the input devices 184. The functions of the upper level control section 144 are performed on a computer, which may be of any suitable configuration sufficient to enable the system 100 to function as described herein. The higher level processing unit 176 receives processed digital data from the secondary digital processing section 142, and translates the data into visual displays that may be configured by a user through a suitable user interface programmed into the higher level processing unit 176, including functions such as providing correct "false color" for two-dimensional displays, three-dimensional displays, and creation of charts, etc. In addition, the higher level processing unit 176 performs additional evaluation functions that are enabled after a complete testing of the physical item 101 has been performed, such as the creation of analytical reports, and so forth.

The various modules, units, components, etc. of the system 100 can be implemented in hardware, software, firmware, and any combination thereof. For example, portions of the system can be implemented using a processor. As used herein, the term "processor" can include a microcontroller, a microcomputer, a programmable logic controller (PLC), a field-programmable gate array (FPGA), an application specific integrated circuit (ASIC), integrated circuits generally referred to in the art as a computer, and other programmable circuits, and these terms are used interchangeably herein. The processor can be coupled to a memory, which can include a random access memory (RAM), a read-only memory (ROM), a flash memory, a compact disc-read only memory (CD-ROM), a magneto-optical disk (MOD), a digital versatile disc (DVD), a non-transitory computer readable storage medium, and so forth. The memory can store instructions for execution by the processor to implement the systems disclosed herein or to execute the methods disclosed herein.

As noted above, signals generated by the processing system 104 cause the ultrasonic transducer array 102 to emit ultrasonic tone bursts that are non-homogeneous across a width and breadth of ultrasonic transducer array 102.

Figure 4:
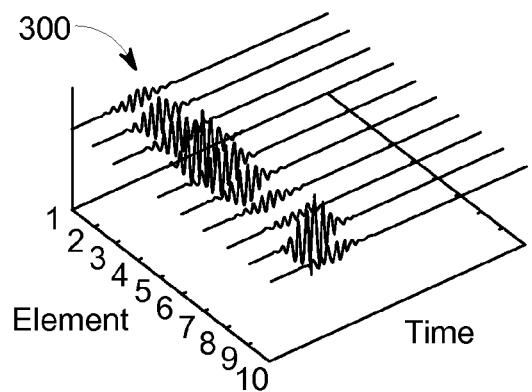
FIG. 4 is a perspective graphic representation of an exemplary series of waveforms used in an exemplary ultrasonic holography imaging system.
Figure 5:
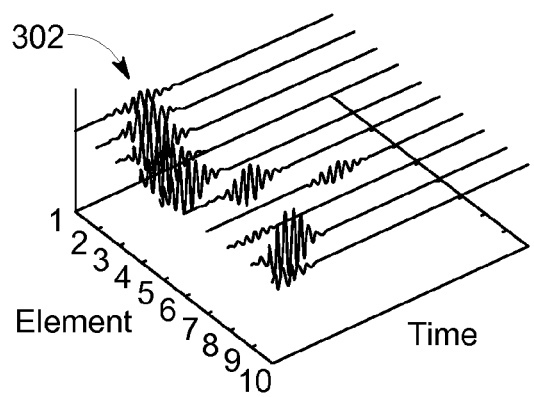
FIG. 5 is a perspective graphic representation of another exemplary series of waveforms used in an exemplary ultrasonic holography imaging system.
Figure 6:
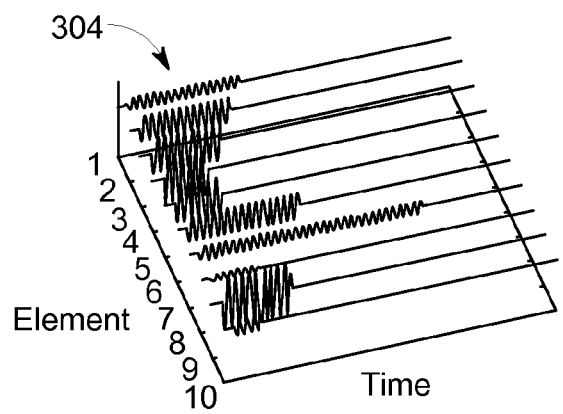
FIG. 6 is a perspective graphic representation of yet another exemplary series of waveforms used in an exemplary ultrasonic holography imaging system.

FIGS. 4-6 illustrate different configurations of waveforms, and wave fronts, that are provided by the system 100. FIG. 4 is a perspective graphic view of a series of waveforms 300 illustrating a first mode of variation of tone bursts. For simplicity of illustration, tone bursts from a single row of the ultrasonic transceiver elements 110 are illustrated. Specifically, the waveforms 300 represent tone bursts that vary in amplitude, but are constant in duration and time of emission. FIG. 5 illustrates a second mode of variation of tone bursts in which a plurality of waveforms 302 represent tone bursts that vary in amplitude, and in time of emission ("time shift"), but are constant in duration. FIG. 6 illustrates a series of waveforms 304 that represent a series of tone bursts that are time shifted, and variable in amplitude and duration.

Figure 7:
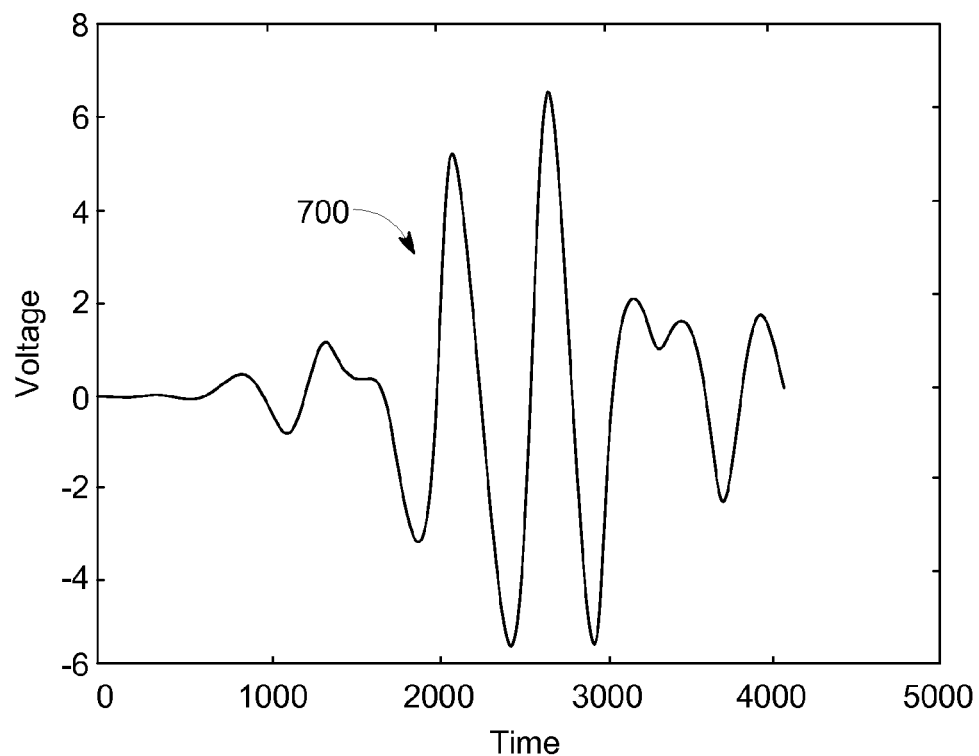
FIG. 7 is a plot of voltage as a function of time for an exemplary fully-analog excitation pulse used in an exemplary ultrasonic holography imaging system.

In order to produce the tone bursts shown in FIGS. 4-6, excitation signals are applied to the ultrasonic transceiver elements 110. FIG. 7 illustrates an exemplary excitation signal in the form of an arbitrary fully-analog excitation pulse 700. It will be appreciated that, in practice, the circuitry and components required to accurately and consistently produce the excitation pulse shown in FIG. 7 involves a significant degree of complexity, production cost, power consumption, and so forth. In addition, modules for generating such pulses are not readily amenable to implementation using ASICs and are limited in terms of voltage and speed.

Accordingly, the system 100 can be configured, in some embodiments or in some modes of operation, to supply multi-level square wave excitation pulses to the ultrasonic transceiver elements 110, instead of fully-analog excitation pulses of the type shown in FIG. 7.

Figure 8:
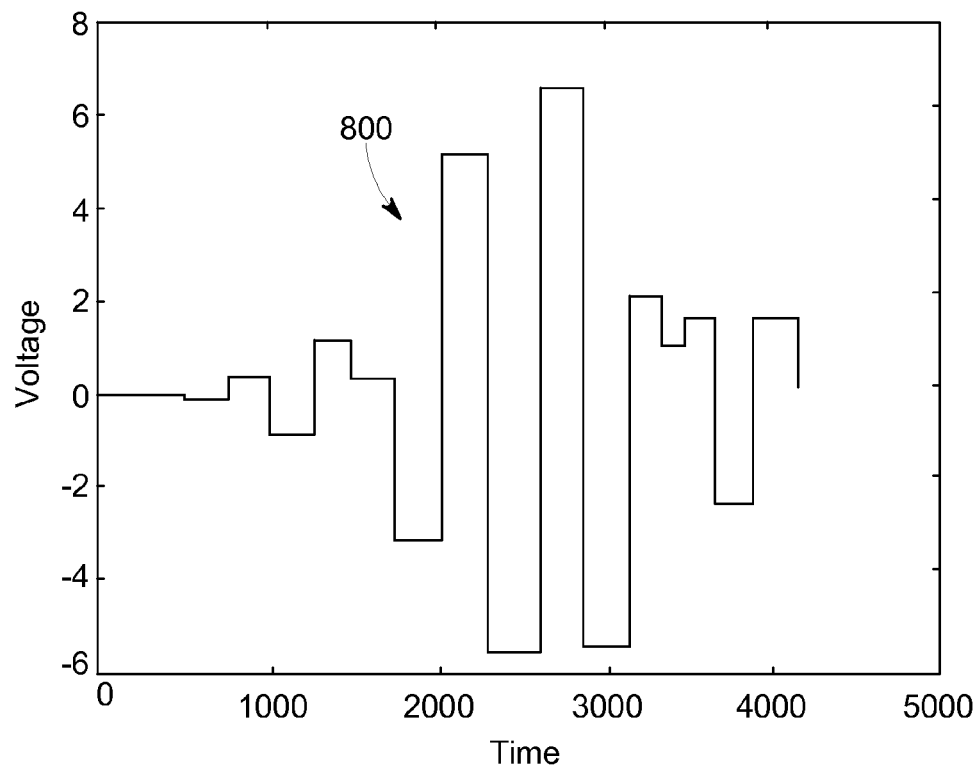
FIG. 8 is a plot of voltage as a function of time for an exemplary multi-level square wave excitation pulse used in an exemplary ultrasonic holography imaging system.

FIG. 8 illustrates an exemplary multi-level square wave excitation pulse 800. The illustrated pulse includes a plurality of square or rectangular pulses or steps at discrete positive and negative amplitude levels. In some embodiments, the multi-level square wave excitation pulse has a plurality of positive rectangular steps and a plurality of negative rectangular steps.

Figure 9:
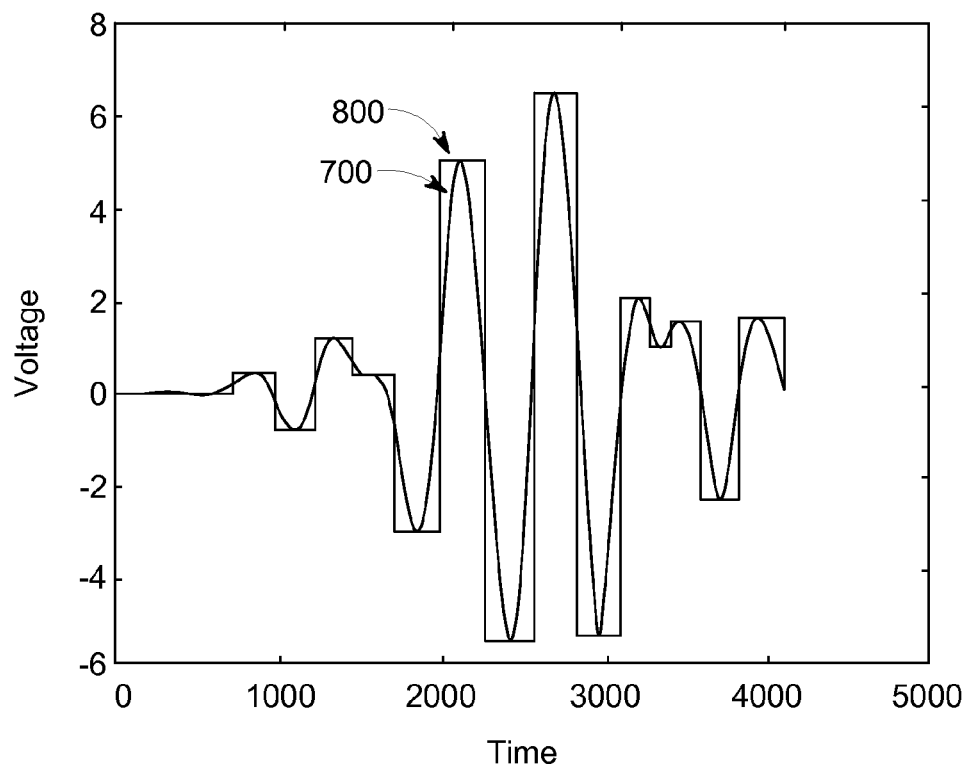
FIG. 9 is a plot of voltage as a function of time for the excitation pulse of FIG. 7 and the excitation pulse of FIG. 8.

The excitation pulses of FIGS. 7 and 8 are shown in FIG. 9 overlain on one another. As shown, the positive and negative square peaks or steps of the multi-level square wave excitation pulse 800 correspond in amplitude to the positive and negative peaks of the analog excitation pulse 700. In addition, the width of the positive and negative square peaks or steps of the multi-level square wave excitation pulse 800 correspond to the width between inflection points of the analog excitation pulse 700. Further, the pulses 700, 800 are phase aligned such that the transitions from one step to the next in the multi-level square wave excitation pulse 800 are aligned in time with the inflection points of the analog excitation pulse 700. It will thus be appreciated that the configuration of the multi-level square wave excitation pulse 800 can be selected by rectangular step sampling a corresponding fully-analog waveform 700.

The response of the ultrasonic transceiver elements to an excitation signal is inherently analog and cannot respond instantaneously to the step changes in voltage of the multi-level square wave excitation pulse 800. In other words, even though a multi-level square wave is used as the excitation pulse, the transceivers will not emit the same multi-level square wave. Rather, the actual ultrasonic waveform emitted will be the convolution of the multi-level square wave excitation pulse and the delta-response function of the transducer. Assuming the transducer response is a Gaussian function, the ultrasonic waveform emitted will closely resemble the desired ultrasonic waveform, even though a multi-level square wave excitation pulse is used in place of a fully-analog waveform.

Accordingly, the output of an ultrasonic transceiver element to which the multi-level square wave excitation pulse 800 is applied can be identical or substantially identical to what the output would have been had the counterpart fully-analog pulse been applied. In addition, the multi-level square wave excitation pulses can be selected by performing de-convolution processing based on the desired ultrasonic waveform and the delta-response function of the transducer.

The system 100 is thus configured to provide a comparable transceiver output using multi-level square wave excitation pulses, while at the same time reducing power consumption, system complexity, and/or cost as compared with systems that use fully-analog excitation pulses.

Figure 10:
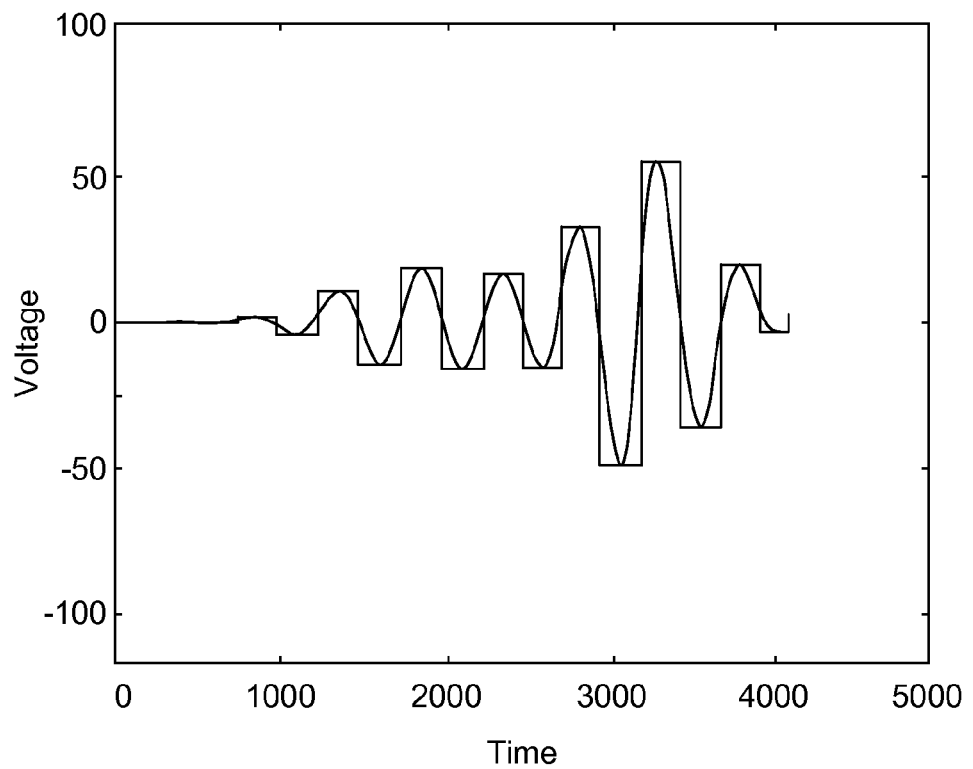
FIG. 10 is a plot of voltage as a function of time for an exemplary multi-level square wave excitation pulse and a counterpart fully-analog excitation pulse used in an exemplary ultrasonic holography imaging system.
Figure 11:
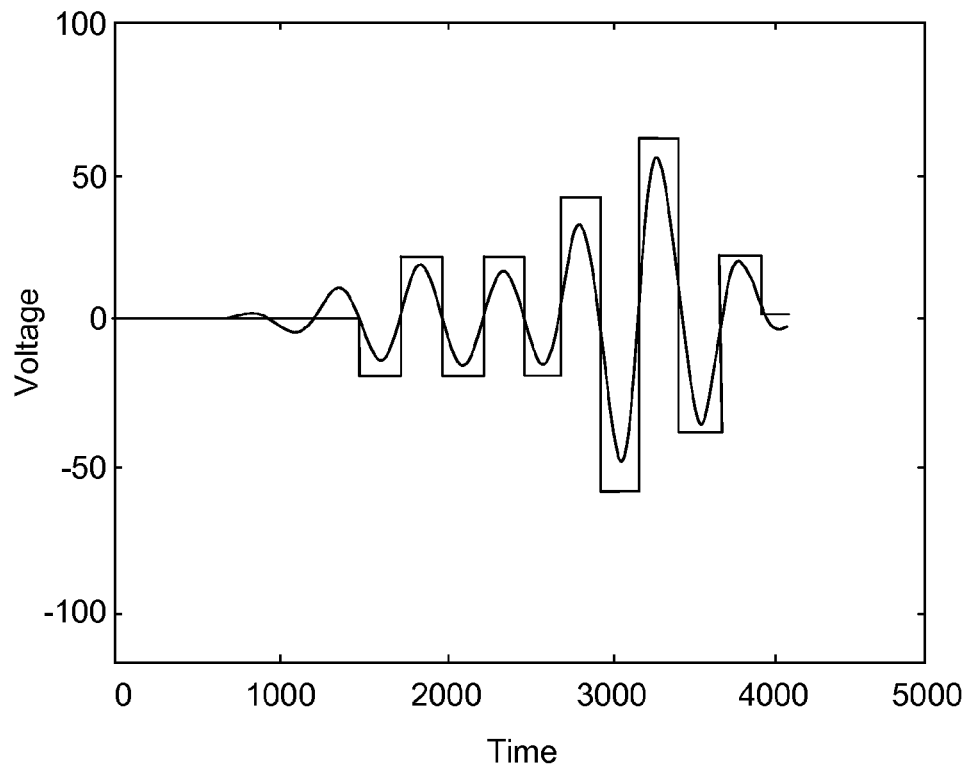
FIG. 11 is a plot of voltage as a function of time for an exemplary multi-level square wave excitation pulse and a counterpart fully-analog excitation pulse used in another exemplary ultrasonic holography imaging system.

The degree to which the multi-level square wave excitation pulse corresponds to a counterpart fully-analog excitation pulse is limited by the number of possible voltage levels or steps that can be included in the multi-level square wave excitation pulse. As shown in FIG. 10, when the number of possible voltage levels is high, the amplitude of the steps in the multi-level square wave excitation pulse corresponds exactly or almost exactly to the amplitude of the peaks in the counterpart analog excitation pulse. On the other hand, when the number of possible voltage levels is reduced (e.g., as shown in FIG. 11), the peaks in the analog excitation pulse are mapped to the closest voltage level and the respective amplitudes may or may not correspond exactly. Generally speaking, the greater the number of possible voltage levels available to construct the multi-level square wave excitation pulse, the greater the degree to which the transceiver output triggered by said pulse will correspond to the output had a counterpart fully-analog excitation pulse been used. In some embodiments, the system 100 is configured to produce multi-level square wave excitation pulses with up to five discrete positive voltage levels, up to five discrete negative voltage levels, and up to one zero voltage level for a total of up to eleven steps (e.g., −100V, −80V, −60V, −40V, −20V, 0V, 20V, 40V, 60V, 80V, 100V). In other embodiments, the system can be configured to produce multi-level square wave excitation pulses with more or less than eleven steps, with only positive steps, with only negative steps, with an unequal number of positive and negative steps, and/or with or without a zero level step.

Figure 12:
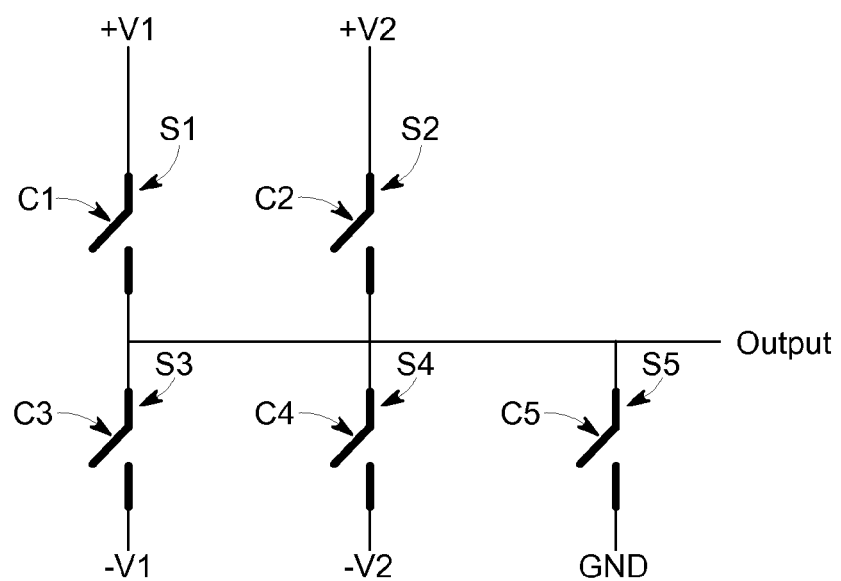
FIG. 12 is a circuit diagram illustrating a pulse generator portion of an exemplary ultrasonic holography system.

FIG. 12 is a schematic diagram of an exemplary circuit for generating multi-level square wave excitation pulses of the type described herein. The illustrated circuit is included in each of the pulse generators 146 (shown in FIG. 3) or each of the pulse train generators 146 (shown in FIG. 18). The circuit includes a plurality of switches (e.g., transistors such as MOSFETs) S1-S5 coupled between an output node and a plurality of voltage rails −V1, −V2, GND, +V1, +V2. A plurality of control lines C1-C5 control operation of respective ones of the switches S1-S5 to selectively place the output node in electrical communication with respective ones of the voltage rails. The control lines C1-C5 are controlled by digital logic circuitry (e.g., the transmitter controller 152) to change the voltage at the output node according to the partial truth table shown in FIG. 13. The circuit of FIG. 12 can thus produce a multi-level square wave excitation pulse with at least five discrete voltage levels or steps (i.e., −V2, GND, +V1, +V2). It is understood that the illustrated circuit can be readily modified to provide additional or fewer voltage steps.

Figure 14:
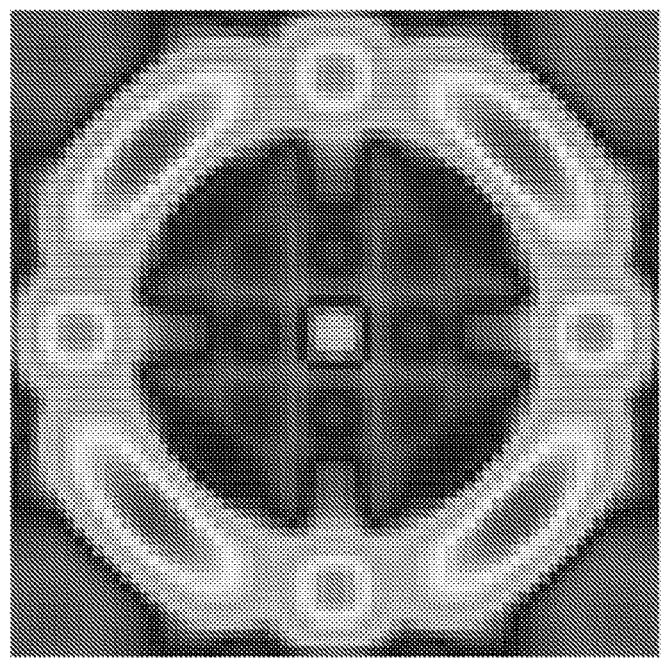
FIG. 14 is a simulated mapping of the output of an exemplary transducer array when fully-analog excitation signals are used to drive the transducer array to create an arbitrary sound field.
Figure 15:
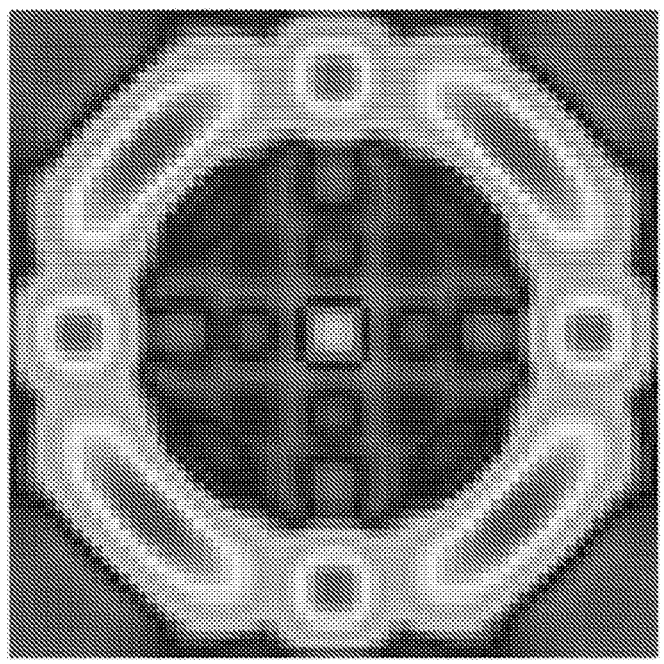
FIG. 15 is a simulated mapping of the output of an exemplary transducer array when multi-level square wave excitation signals are used to drive the transducer array to create an arbitrary sound field.

A simulated exemplary acoustic holography output generated by the system 100 when fully-analog excitation pulses are used is shown in FIG. 14. As shown in FIG. 15, there is a high degree of similarity in the output of the system 100 when multi-level square wave excitation pulses with up to eleven steps are used instead. Of course, the degree of similarity can be optimized by using additional or fewer steps as described above.

Figure 16:
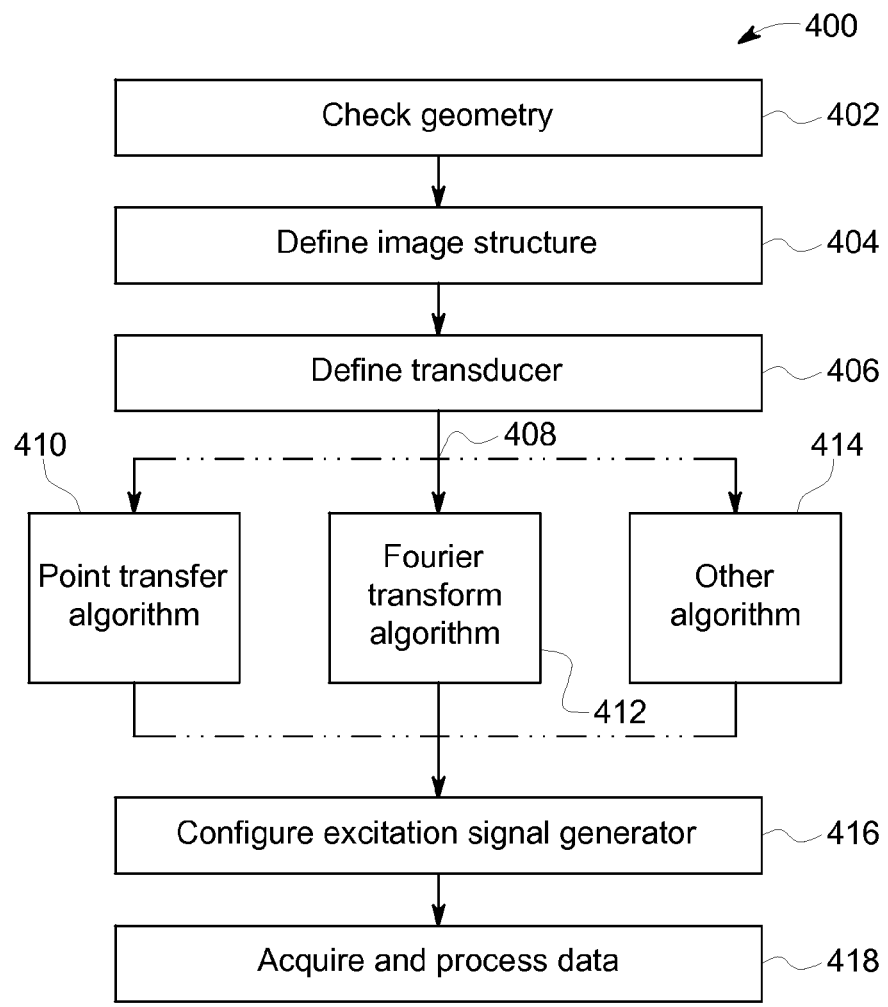
FIG. 16 is a flowchart illustrating an exemplary method for imaging a physical item using ultrasonic holography.

FIG. 16 illustrates an exemplary method 400 for performing imaging through ultrasonic holography. First, the geometry of the physical item 101 that is to be inspected is measured and the corresponding data is stored in the system 100 at step 402. Accordingly, areas of the physical item 101 that are known to be historically susceptible to defects in similar physical items are identified, enabling a desired image physical item to be defined in step 404. Once the geometry of the physical item 101 to be inspected and the desired image structure are known, a configuration of a transducer to obtain the desired acoustic image is defined in step 406. For example, a size of an array of piezoelectric elements is selected, an appropriate tone burst pulse frequency is selected, and individual piezoelectric element size and geometry is selected.

An appropriate data processing algorithm is selected in step 408 for use in converting the image structure defined at step 404 into a series of tone bursts having predefined individual configurations, with respect to each ultrasonic transceiver element 110. Several available data processing algorithms, adapted from optical imaging systems known to those skilled in the art, may be used, including a point transfer algorithm 410, a Fourier Transform algorithm 412, or other existing algorithms 414 for performing digital holography.

The selected data processing algorithm is used to transform the defined image structure into instructions to be transmitted to the waveform shaping section 141. For example, use of a point transfer algorithm 410 involves transforming a defined 404 image structure into an array of points in space, defining grayscale values for each point in the array, calculating a desired amplitude and phase for waveforms to be emitted that will impinge upon each point in the array, and providing coherent addition of contributions from each image point to determine the amplitude and phase of each tone burst from each element. The result of use of the point transfer algorithm 410 results in the definition of an interference pattern that the ultrasonic transducer array 102 will create upon emission of the defined series of tone bursts. Use of a Fourier Transform algorithm 412 can include transforming a defined image structure into an array of points in space, and calculating a Fourier transform of the defined image, using optical Fourier propagation to transfer the Fourier transform of the defined image to the ultrasonic transducer array 102. The result of use of the point transfer algorithm 410 or the Fourier Transform algorithm 412 results in the definition of an interference pattern that the ultrasonic transducer array 102 will create upon emission of the defined series of tone bursts, which then interferes to the real acoustic image.

Once the series of ideal tone bursts is defined, multi-level square wave excitation pulses which will cause the transducer array 102 to produce the ideal tone bursts or to produce tone bursts which are very similar to the ideal tone bursts are calculated in step 416. In particular, when the system is operating in the first mode of operation, the pulse generators 146 of the waveform shaping section 141 are configured or programmed to produce multi-level square wave excitation pulses which are rectangular-sampled approximations of a counterpart fully-analog excitation pulse. When the system is operating in the second mode of operation, the pulse generators 146 are configured or programmed to produce fully-analog excitation pulses. The mode of operation is user selectable or can be selected automatically by the system 100.

After a desired algorithm for processing data to be acquired is selected in step 408, and after the waveform shaping section 141 is configured in step 416 to produce the desired excitation signals, actual data acquisition occurs in step 418. During data acquisition in step 418, one or more ultrasonic pulses are emitted by the ultrasonic transducer array 102, with tone bursts emitted from different ones of the ultrasonic transceiver elements 110 varying in amplitude, duration, and/or time shift, as appropriate for the geometry of the physical item 101 being imaged and the predefined desired image structure. Reflected ultrasonic waves are received by the ultrasonic transceiver elements 110, and raw waveform signals are stored in the storage elements 161. The raw signals are amplified and pre-processed in the analog processing section 107 of the system 100 to produce A-scans, as described. Once generated, A-scans may be evaluated using known ultrasonic imaging techniques, for example to develop higher level visualizations, such as B-scans. As used herein, "B-scans" refers to a fully-developed, color scale three-dimensional image of an object. Data contained in A-scans may also be used in alarm systems through comparison with predefined threshold data. Finally, raw signals and processed signals obtained during an imaging session may be exported from the system 100 for data storage or additional evaluation.

While various methods disclosed herein may be shown in relation to flowcharts or sequence diagrams, it should be noted that any ordering of method steps implied by such flowcharts, sequence diagrams, or the description thereof is not to be construed as limiting the method to performing the steps in that order. Rather, the various steps of each of the methods disclosed herein can be performed in any of a variety of sequences. In addition, as the illustrated flowcharts and sequence diagrams are merely exemplary embodiments, various other methods that include additional steps or include fewer steps than illustrated are also within the scope of the present disclosure.

The systems and methods disclosed herein produce a number of potential benefits and/or technical effects. For example, in contrast to known ultrasonic holography systems, the ultrasonic holography imaging systems described herein are configured, in some embodiments, to generate and transmit non-homogeneous sound fields independent of transducer configuration. The ultrasonic holography imaging systems described herein enable, in some embodiments, the creation of real acoustic three dimensional images allowing the generation of a virtual image with improved definition and differentiation features, in comparison to known ultrasonic holography systems that work without the generation of a real acoustic image. In addition, the ultrasonic holography imaging systems described herein provide, in some embodiments, enhanced imaging that is capable of addressing the shape and configuration of the physical item being imaged. Furthermore, in contrast to known ultrasonic holography imaging systems, the systems and methods described herein provide, in some embodiments, for the creation of ultrasonic waveforms emitted from separate ultrasonic transceivers in an ultrasonic transducer array, such that at least two of the plurality of ultrasonic waveforms are differentiated from each other through variation of at least one of amplitude, frequency, time shift, and phase or modulations thereof. Further, the systems and methods described herein provide, in some embodiments, excitation of a transducer array using multi-level square wave excitation pulses which can be produced with reduced complexity, cost, and/or power consumption as compared with fully-analog excitation pulses, and which are less limited in terms of voltage, speed, and ASIC implementation flexibility.

An embodiment of the method is applied to a pipe-shaped test object. In this case, it has proved to be particularly beneficial if the geometry of the generated ultrasonic field in the test object corresponds to a plurality of sections of the envelope of a cone whose axis of symmetry stands perpendicular on the pipe surface. In the case of this testing task, the danger of crosstalk of echo signals stemming from one cone envelope section to another cone envelope section can be minimized by the generated ultrasonic field having a disappearing sound amplitude in a plane extending through the insonification point and oriented transverse to the longitudinal pipe axis. It is thus prevented that echo signals resulting from a first insonified cone envelope section are erroneously ascribed to a second insonified cone envelope section. In this special embodiment of the method, the circumferential line of the pipe to be examined, in which the disappearing sound pressure from the insonified cone envelope sections is present, is tested by means of one or several separate test probes whose insonification direction, in the projection onto the pipe surface, lies exactly on the aforementioned circumferential line. In particular, this may be a phased array technique angle test probe, particularly two oppositely disposed phased array technique angle test probes, whose insonification angle into the pipe to be tested can be controlled electronically. This is possible, for example, with individually drivable ultrasonic transducer elements disposed in a linear array.

In a particular way of carrying out the method, it is not a particular insonification angle, which is being varied electronically from pulse to pulse, that is being used. Rather, it is possible to generate, by means of the linear array, a strongly divergent ultrasonic field, which propagates in the pipe to be examined along the above-mentioned circumferential line (in projection). The reception and evaluation is then carried out by means of the individual ultrasonic transducers of the array. Also in this case, the application of the reception processing rules can be done in accordance with the "paint brush method".

Figure 19A:
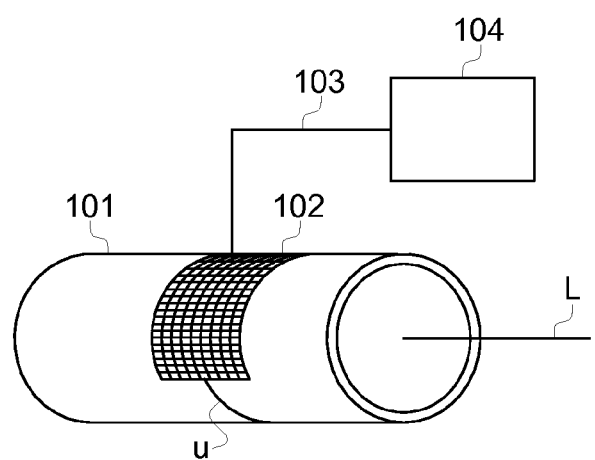
FIG. 19A is a schematic representation of a section through the wall of a pipe to be tested, with the indicated course of the insonified ultrasound.
Figure 19B:
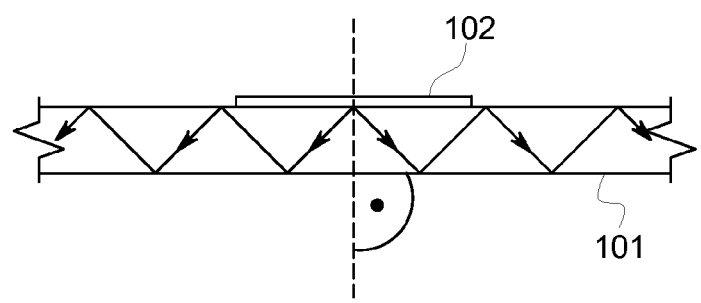
FIG. 19B is a schematic representation of the profile of the ultrasonic field insonified into the test object by the ultrasonic transmitting array at a depth d in the test object.
Figure 19C:
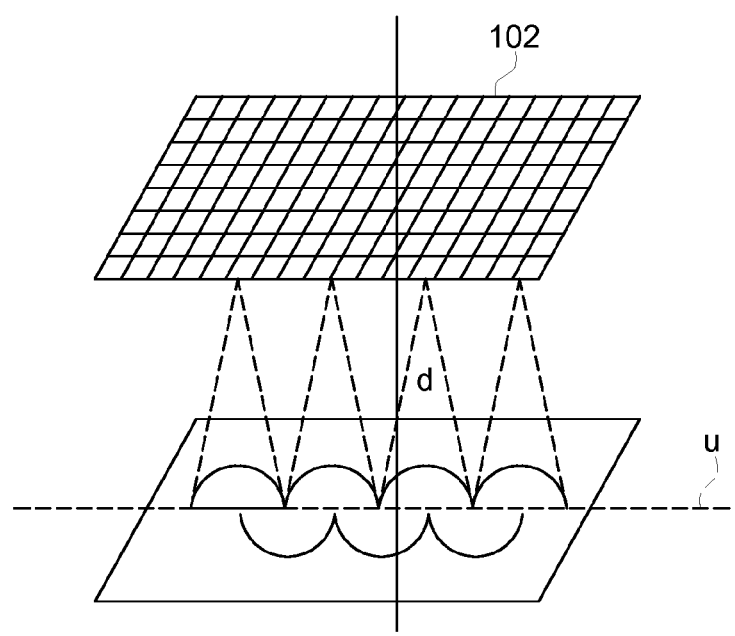
FIG. 19 is a schematic representation of an exemplary embodiment in the form of a pipe testing system.

Referring to FIGS. 19, 19A and 19b, an exemplary embodiment of a testing device 104 according to the embodiments will be described that is configured for carrying out the above-described method. The basic structure of the testing device 104 corresponds to the structure illustrated in FIG. 1. In this exemplary embodiment, the testing device is configured for the inline testing of a pipe 101, which is moved in the direction of the longitudinal pipe axis L by a conveying device that is not shown at a speed of up to a few meters per second. In this case, the ultrasonic transmitting device is configured for generating an ultrasonic field in the test object 101 whose geometry corresponds to a plurality of sections of the envelope of a cone, whose axis of symmetry stands perpendicular on the pipe surface. In order to generate the ultrasonic field, an array 102 of typically 8×64 independently drivable ultrasonic transducers is used, whose shape is adapted to the outer circumference of the pipe 101 to be tested. It is acoustically coupled via a water gap that is not shown. A cross section through the ultrasonic field insonified by the array 102 in the test object 101 at the depth d is shown in FIG. 19B. From this, it is apparent that the ultrasonic field in the plane shown is composed of a plurality of opposite, approximately halved cone envelopes, with the ultrasound amplitude being at minimum, particularly zero, on the circumferential line (also see FIG. 19). This means that the ultrasonic field, for whose generation the ultrasonic transmitting device is configured, has a disappearing sound amplitude in a plane extending through the insonification point and oriented transverse to the longitudinal pipe axis. FIG. 19A schematically shows the sound paths in the wall of the pipe-shaped test object, which run in a zigzag due to total reflection.

Figure 20A:
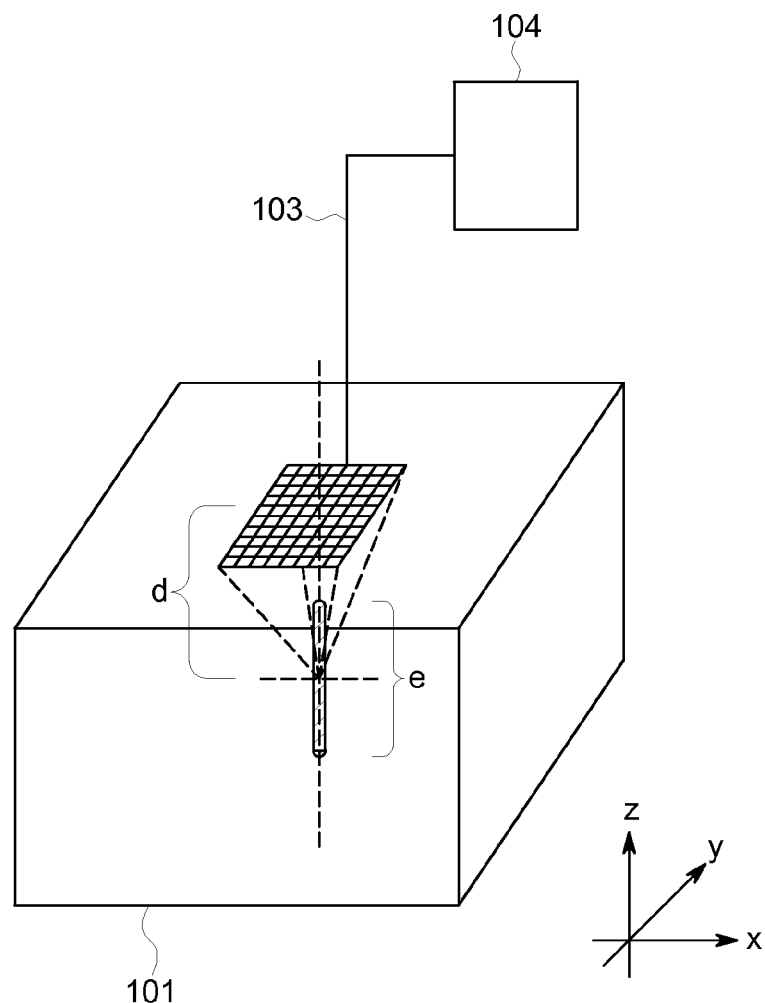
FIG. 20A is a schematic representation of another exemplary embodiment in the form of a pipe testing system for test objects with an increased wall thickness.
Figure 20B:
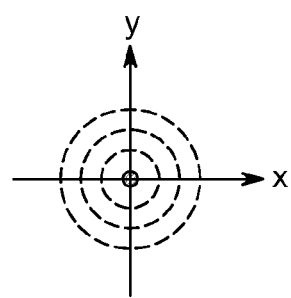
FIG. 20B is a schematic representation of the profile of the ultrasonic field insonified into the test object by the ultrasonic transmitting array at a depth d in the test object.

Another exemplary embodiment for the testing device is explained with reference to the FIGS. 20A and 20B. This testing device is particularly suitable for testing test objects 101 with an increased wall thickness, e.g. plate-shaped material as shown in FIG. 20A, which is tested in a direction transverse to the plate direction, or rod-shaped material, which is to be tested along its longitudinal axis. Mention must also be made by way of example of safety vessels with a large wall thickness, such as reactor pressure vessels or transport containers for highly radioactive waste.

In order to solve this testing task, an ultrasonic field is generated that is cylindrically symmetric in the test object 101 and has a focus whose length 1 is greater than the Rayleigh length of the ultrasonic pulse used. The ultrasonic transmitting transducer-specific digital transient excitation functions suitable for generating an ultrasonic field with such a geometry can be calculated based on a point transfer algorithm or a Fourier Transform algorithm also in this case, based on the desired geometry of the ultrasonic field in the test object.

A testing device with such a configuration for testing a test object 101 with an increased wall thickness is shown by way of example in FIG. 20A. The basic structure of the testing device 104 again corresponds to the structure illustrated in FIG. 1. In that case, the ultrasonic transmitting device is configured to generate, by means of an array of typically 8×8 individually drivable ultrasonic transducers, an ultrasonic field in the test object 101 that is cylindrically symmetric and has a focus whose length 1 is greater than the Rayleigh length of the ultrasonic pulses used for testing. In the exemplary embodiment shown, an ultrasonic field having the geometry of a Bessel beam is generated in the test object 101 by means of ultrasonic holography. The beam cross section resulting at the depth d in the test object 101 is shown, by way of example, in FIG. 20A.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A method for the non-destructive testing of a test object using an ultrasound, comprising the steps of:
   generating a pulsed ultrasonic field in the test object with an array of individually drivable ultrasonic transmitting transducers acoustically coupled to the test object, the ultrasonic transmitting transducers each being driven with a specific analog transient excitation signal, wherein each analog transient excitation signal is generated based on an ultrasonic transmitting transducer-specific stored digital transient excitation function, wherein the ultrasonic transmitting transducer-specific analog transient excitation function is generated by a series of multi-level square wave signals, and wherein a width of respective multi-level square wave signals correspond to a width between respective inflection points of the analog transient excitation signal,
   receiving resulting echo signals from the test object with an array of individually drivable ultrasonic receiving transducers, wherein each ultrasonic receiving transducer provides an analog time-resolved echo signal,
   providing transducer-specific digitization of the time-resolved analog echo signals,
   temporarily storing the time-resolved, transducer-specific, digitized echo signals in the form of an echo signal set,
   applying a plurality of different reception processing rules to the echo signal set, wherein a reception processing rule has at least the following reception processing parameters:
      the number and identity of the ultrasonic receiving transducers whose echo signals are being taken into account in the reception processing rule,
      individual phase shifts applied to the echo signals taken into account in the reception processing rule, and, if applicable,
      time frames in which the echo signals lie that are to be taken into account in the reception processing rule.

2. The method according to claim 1, wherein the applied reception processing rules differ in at least one of the reception processing parameters.

3. The method according to claim 1, wherein an image of at least one section of the test object volume is generated based on the result of the applied plurality of reception processing rules.

4. The method according to claim 3, wherein the image is two- or three-dimensional.

5. The method according to claim 1, wherein the test object has a predefined geometry, further comprising the steps of:
   predefining a sound field geometry of the ultrasonic field insonified into the test object, which is adapted to the geometry of the test object and to the testing task to be carried out, and
   determining the ultrasonic transmitting transducer-specific digital transient excitation functions that are suitable for generating an ultrasonic field in the test object with the predefined sound field geometry with the array of ultrasonic transmitting transducers.

6. The method according to claim 5, wherein the suitable ultrasonic transmitting transducer-specific digital transient excitation functions are determined based on a point transfer algorithm or a Fourier Transform algorithm.

7. The method according to claim 1, wherein the reception processing rules constitute an implementation of the paint brush method or of the dynamic depth focusing method.

8. The method according to claim 1, wherein the test object is a pipe and the geometry of the generated ultrasonic field in the test object corresponds to a plurality of sections of the envelope of a cone whose axis of symmetry stands perpendicular on the pipe surface.

9. The method according to claim 8, wherein the generated ultrasonic field has a disappearing sound amplitude in a plane extending through the insonification point and oriented transverse to the longitudinal pipe axis.

10. The method according to claim 1, wherein the test object is a test object with an increased wall thickness, and the generated ultrasonic field in the test object is cylindrically symmetric and has a focus whose length is greater than the Rayleigh length of the ultrasound.

11. The method according to claim 10, wherein the geometry of the ultrasonic field in the test object corresponds to a Bessel beam.

12. A device for the non-destructive testing of a test object with an ultrasound, comprising:
   an ultrasonic transmitting unit configured to generate a pulsed ultrasonic field in the test object with an array of individually drivable ultrasonic transmitting transducers acoustically coupled to the test object, by the ultrasonic transmitting transducers each being driven with a specific analog transient excitation signal, wherein each analog transient excitation signal is generated based on an ultrasonic transmitting transducer-specific digital transient excitation function stored in the ultrasonic transmitting unit, wherein the ultrasonic transmitting transducer-specific analog transient excitation function is generated by a series of multi-level square wave signals, and wherein a width of respective multi-level square wave signals correspond to a width between respective inflection points of the analog transient excitation signal,
   an ultrasonic receiving unit configured to:
      receive resulting echo signals from the test object with an array of individually drivable ultrasonic receiving transducers, each ultrasonic receiving transducer providing an analog time-resolved echo signal,
      digitize in a transducer-specific way and temporarily store, in the form of an echo signal set, the analog echo signals that were received in a time-resolved manner, and
      apply a plurality of different reception processing rules to the echo signal set, a reception processing rule having at least the following reception processing parameters:
         the number and identity of the ultrasonic receiving transducers whose echo signals are being taken into account in the reception processing rule, individual phase shifts applied to the echo signals taken into account in the reception processing rule, and, if applicable, time frames in which the echo signals lie that are to be taken into account in the reception processing rule.

13. The device according to claim 12, wherein the applied reception processing rules differ in at least one of the reception processing parameters.

14. The device according to claim 12, wherein the ultrasonic receiving unit is further configured to generate an image of at least one section of the test object volume based on the result of the applied plurality of reception processing rules.

15. The device according to claim 14, wherein the image is two- or three-dimensional.

16. The device according to claim 12, wherein the test object has a predefined geometry, and wherein the ultrasonic transmitting unit is configured for insonifying an ultrasonic field into the test object whose sound field geometry is adapted to the geometry of the test object and to the testing task to be carried out.

17. The device according to claim 16, wherein the ultrasonic transmitting unit further comprises a calculating unit configured for determining the ultrasonic transmitting transducer-specific digital transient excitation functions that are suitable for generating an ultrasonic field in the test object with the predefined sound field geometry with the array of ultrasonic transmitting transducers.

18. The device according to claim 17, wherein the calculating unit is configured for determining the suitable ultrasonic transmitting transducer-specific digital transient excitation functions based on a point transfer algorithm or a Fourier Transform algorithm.

19. The device according to claim 12, wherein the reception processing rules constitute an implementation of the paint brush method or of the dynamic depth focusing method.

20. The device according to claim 12, wherein the device is a device for testing a pipe, and that the ultrasonic transmitting device is configured for generating an ultrasonic field in the test object whose geometry corresponds to a plurality of sections of the envelope of a cone, whose axis of symmetry stands perpendicular on the pipe surface.

21. The device according to claim 12, wherein the ultrasonic field, for whose generation the ultrasonic transmitting device is configured, has a disappearing sound amplitude in a plane extending through the insonification point and oriented transverse to the longitudinal pipe axis.

22. The device according to claim 12, wherein the device is a device for testing a test object with an increased wall thickness, and the ultrasonic transmitting device is configured to generate an ultrasonic field in the test object that is cylindrically symmetric and has a focus whose length is greater than the Rayleigh length of the ultrasound.

23. The device according to claim 22, wherein the geometry of the ultrasonic field, for whose generation the ultrasonic transmitting device is configured, in the test object corresponds to a Bessel beam.

* * * * *